US009179597B1

(12) United States Patent
Kaspar

(10) Patent No.: US 9,179,597 B1
(45) Date of Patent: Nov. 10, 2015

(54) LAWNMOWER WITH TELESCOPING HANDLE

(71) Applicant: Adrienne B. Kaspar, Freeland, MD (US)

(72) Inventor: Adrienne B. Kaspar, Freeland, MD (US)

( * ) Notice: Subject to any disclaimer, the term of this patent is extended or adjusted under 35 U.S.C. 154(b) by 33 days.

(21) Appl. No.: 14/245,876

(22) Filed: Apr. 4, 2014

Related U.S. Application Data

(60) Provisional application No. 61/808,411, filed on Apr. 4, 2013.

(51) Int. Cl.
*A01D 34/00* (2006.01)
*A01D 34/685* (2006.01)
*A01D 34/68* (2006.01)
*A01D 34/80* (2006.01)
*A01D 34/82* (2006.01)

(52) U.S. Cl.
CPC .......... *A01D 34/685* (2013.01); *A01D 34/6812* (2013.01); *A01D 34/80* (2013.01); *A01D 34/824* (2013.01); *A01D 2034/6831* (2013.01); *A01D 2034/6837* (2013.01)

(58) Field of Classification Search
CPC ..... A01D 34/90; A01D 34/416; A01D 34/84; A01D 34/001; A01D 34/824; Y10S 56/18
USPC ....... 56/12.7, DIG. 18; 30/276; D8/8; D15/10
See application file for complete search history.

(56) References Cited

U.S. PATENT DOCUMENTS

| 456,472 | A | * | 7/1891 | Braun et al. | ......... | A01D 34/412 16/DIG. 38 |
| 1,493,223 | A | * | 5/1924 | Peters | .................. | A01D 34/475 56/10.5 |
| 2,038,697 | A | * | 4/1936 | Winslow | ................. | A47L 9/325 15/144.1 |
| 2,514,278 | A | * | 7/1950 | Dunn | ..................... | A01D 34/78 56/17.4 |
| D201,693 | S | * | 7/1965 | Abrahamsen et al. | ............. | D8/8 |
| 4,052,789 | A | * | 10/1977 | Ballas, Sr. | ............ | A01D 34/416 30/276 |
| 4,202,094 | A | * | 5/1980 | Kalmar | ................ | A01D 34/416 30/276 |
| 4,899,446 | A | * | 2/1990 | Akiba | .................... | A01D 34/90 30/276 |
| 5,279,102 | A | * | 1/1994 | Foster | .................. | A01D 34/001 56/12.7 |
| 5,542,183 | A | * | 8/1996 | Allison | .................. | A62B 3/005 30/276 |
| D423,308 | S | * | 4/2000 | Marshall | ........................... | D8/8 |
| 6,260,278 | B1 | * | 7/2001 | Faher | .................. | A01D 34/902 172/41 |
| D482,582 | S | * | 11/2003 | Chunn | .............................. | D8/8 |
| D563,740 | S | * | 3/2008 | Andriolo | ........................... | D8/8 |
| 8,769,830 | B1 | * | 7/2014 | Brown | .................. | A01D 34/90 30/276 |
| 8,869,405 | B2 | * | 10/2014 | Codeluppi | ............. | A01D 34/90 30/276 |
| 2002/0007559 | A1 | * | 1/2002 | Morabit | ............... | A01D 34/416 30/276 |
| 2003/0041578 | A1 | * | 3/2003 | Fuller | .................. | A01D 34/001 56/12.7 |
| 2004/0221560 | A1 | * | 11/2004 | Dunda | .................. | A01D 34/90 56/12.7 |

FOREIGN PATENT DOCUMENTS

| CN | 20392107 | U | * | 11/2014 | ............. | B62K 15/00 |
| DE | WO 2005009110 | A1 | * | 2/2005 | ........... | A01D 34/416 |
| NL | EP 0976313 | A2 | * | 2/2000 | ............. | A01D 34/84 |
| NZ | WO 2004107844 | A1 | * | 12/2004 | ............. | A01D 34/90 |

* cited by examiner

*Primary Examiner* — Árpád Fábián-Kovács

(74) *Attorney, Agent, or Firm* — Garcia-Zamor IP Law; Ruy M. Garcia-Zamor

(57) ABSTRACT

A lawnmower with a plurality of motorized cutting blades may be configured to include a constant velocity joint to connect the telescoping handle of the lawnmower to the lawnmower body. The constant velocity joint may allow the lawnmower body to move in vertical or horizontal directions while the handle remains upright.

14 Claims, 38 Drawing Sheets

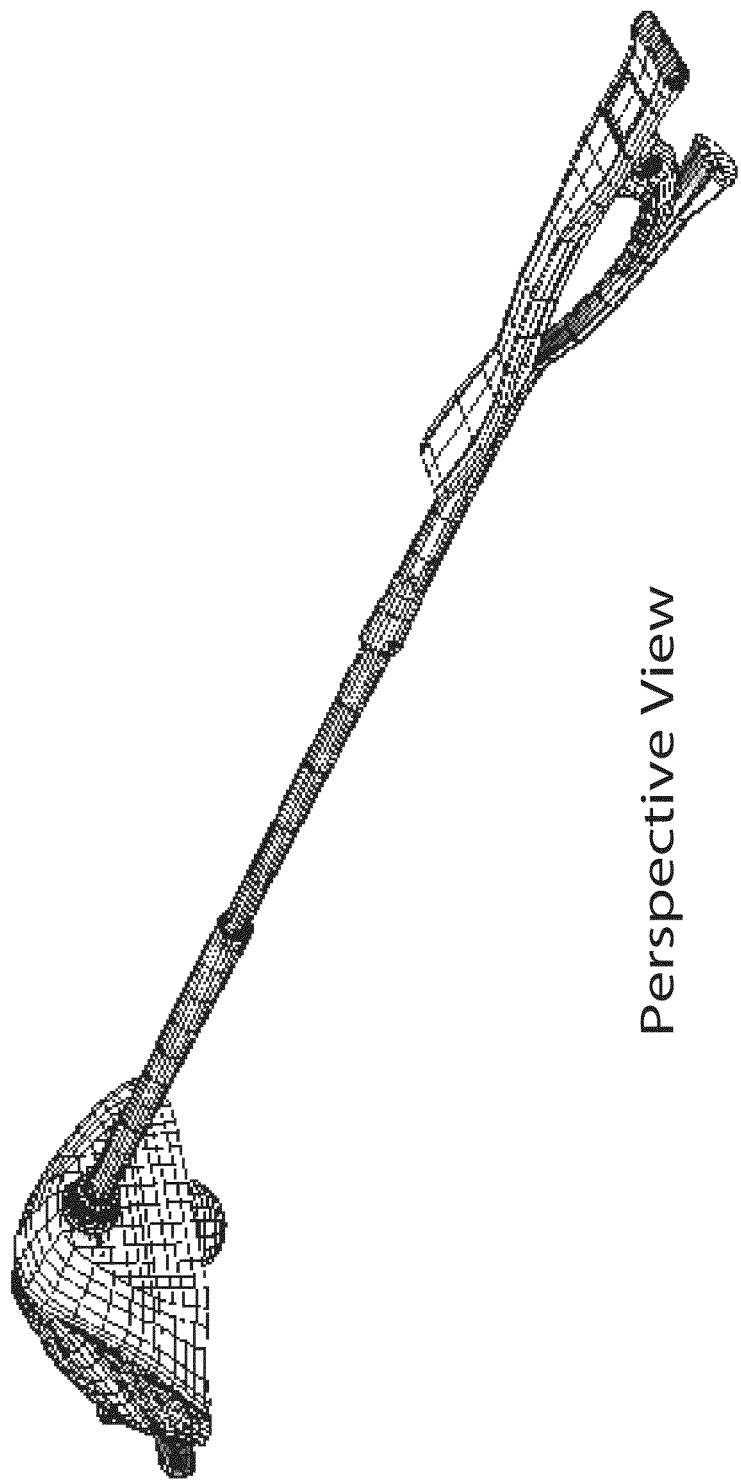
Fig. 1A  Perspective View

Top View

Right Side View

Bottom View

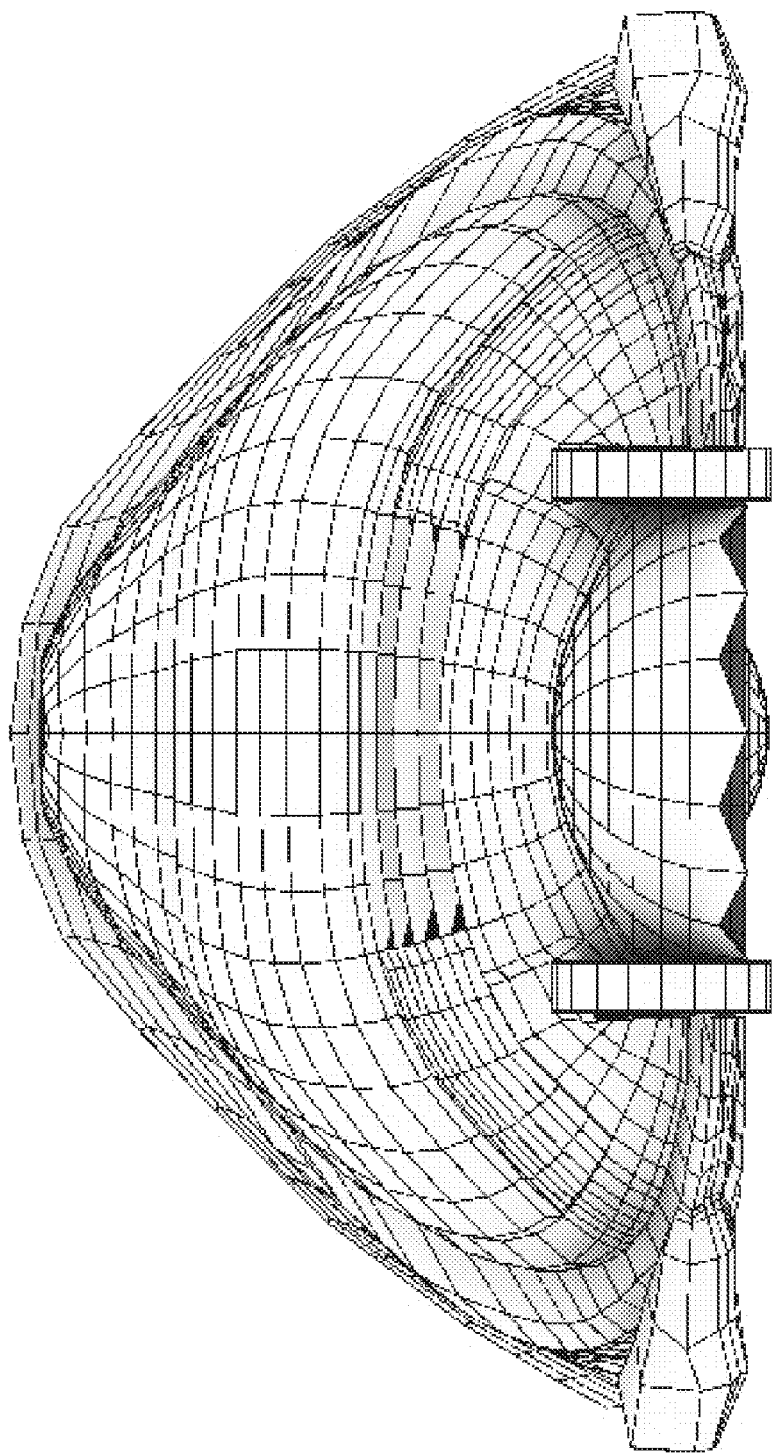

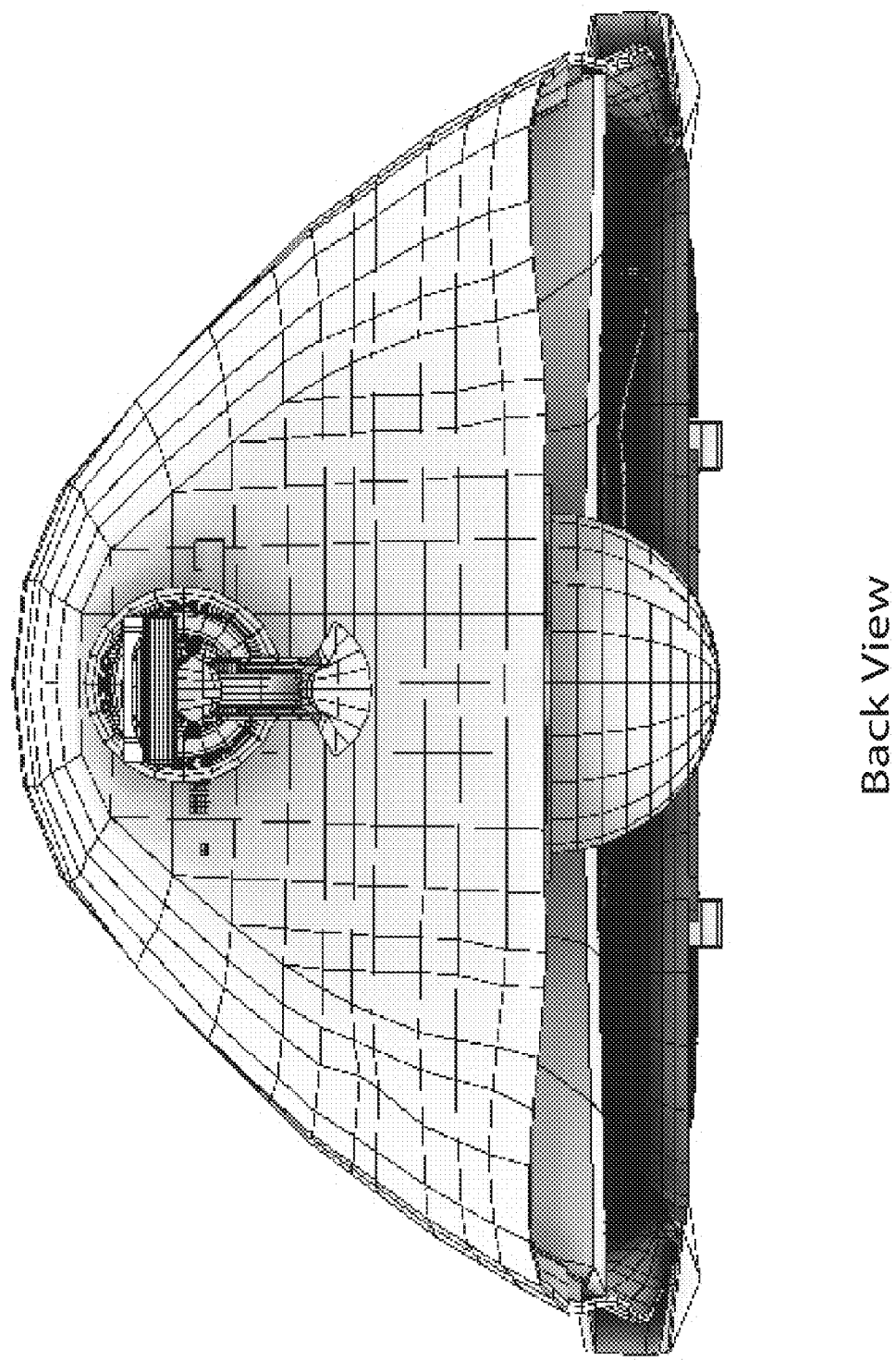

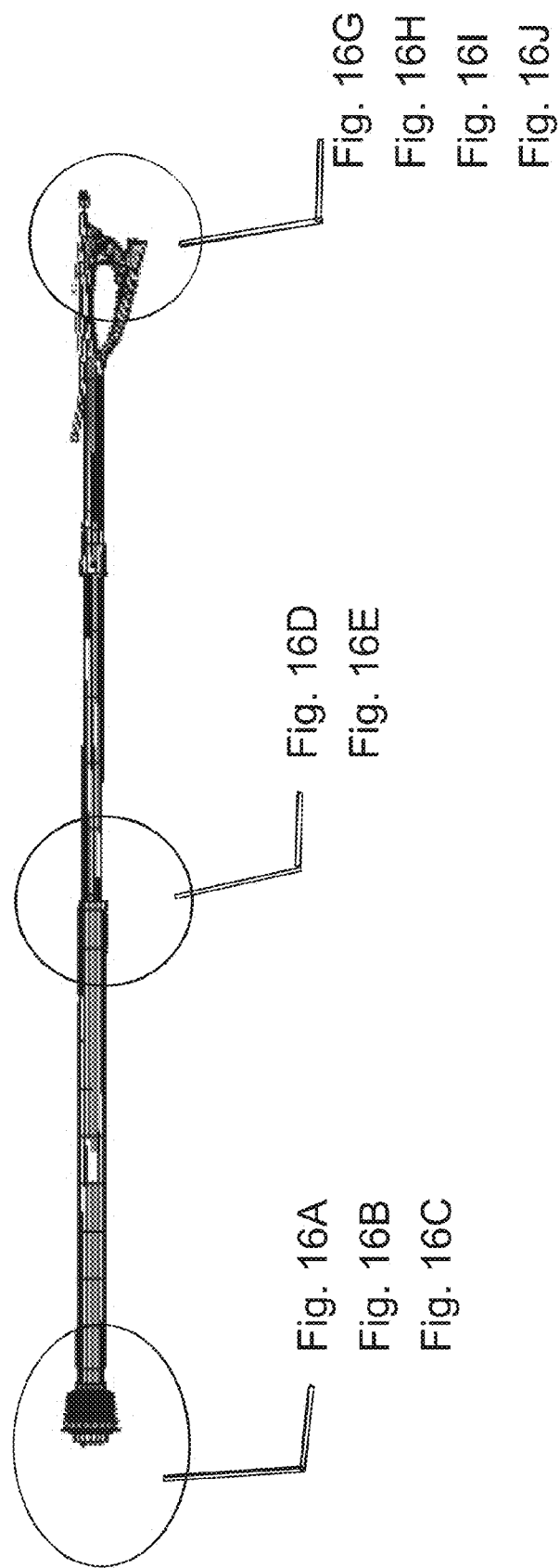

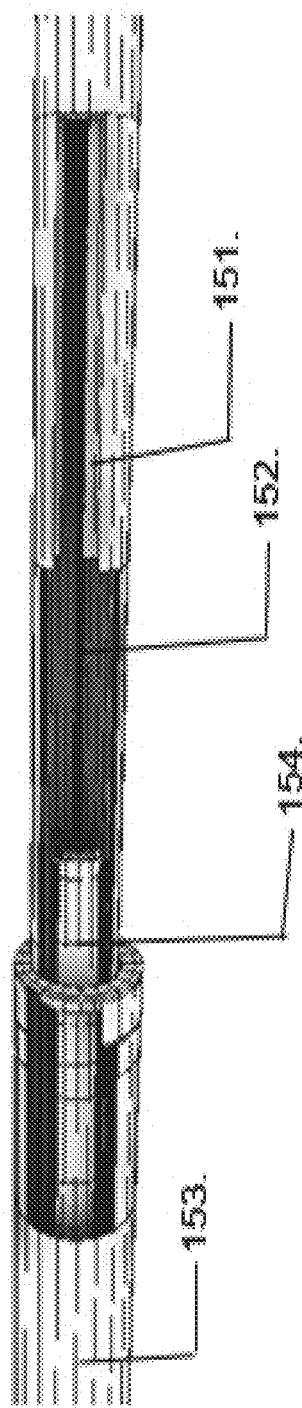

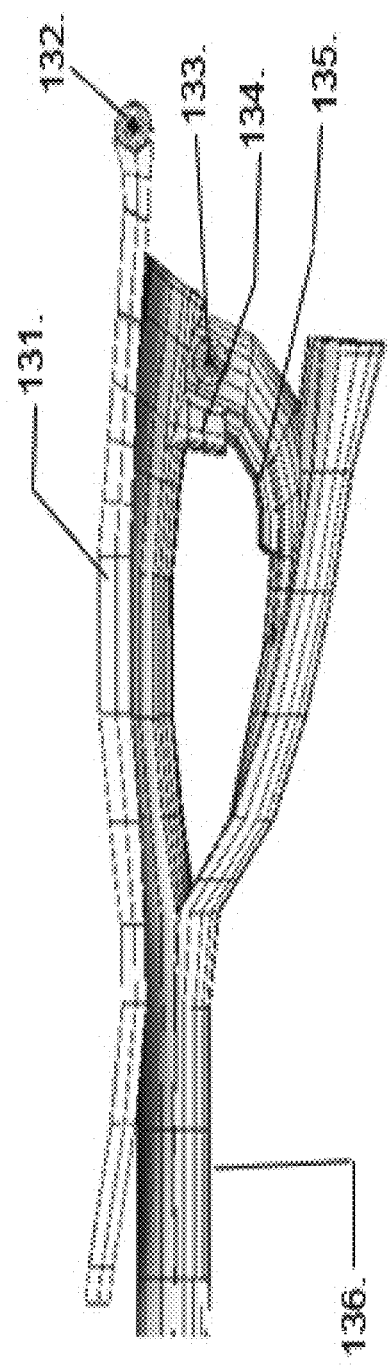

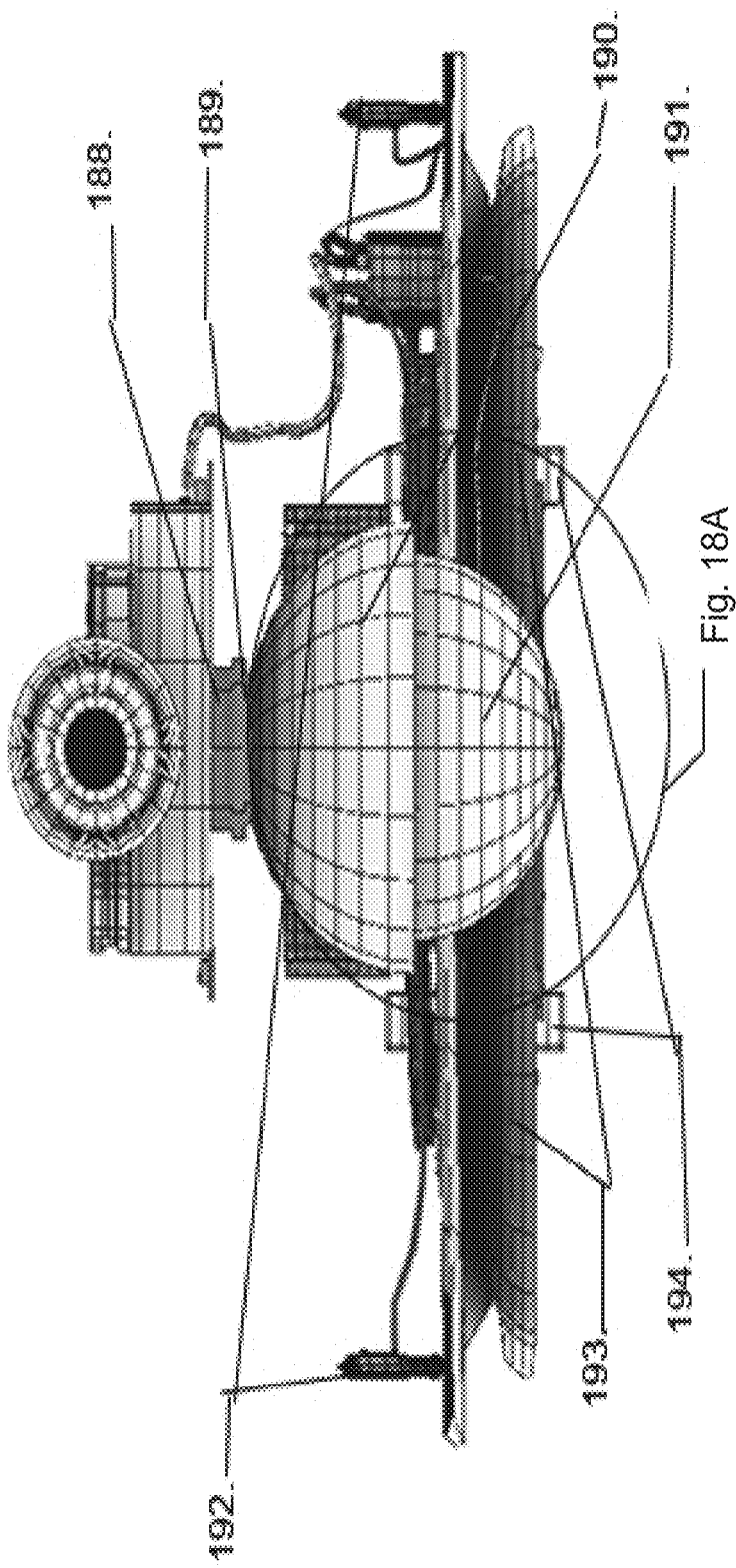

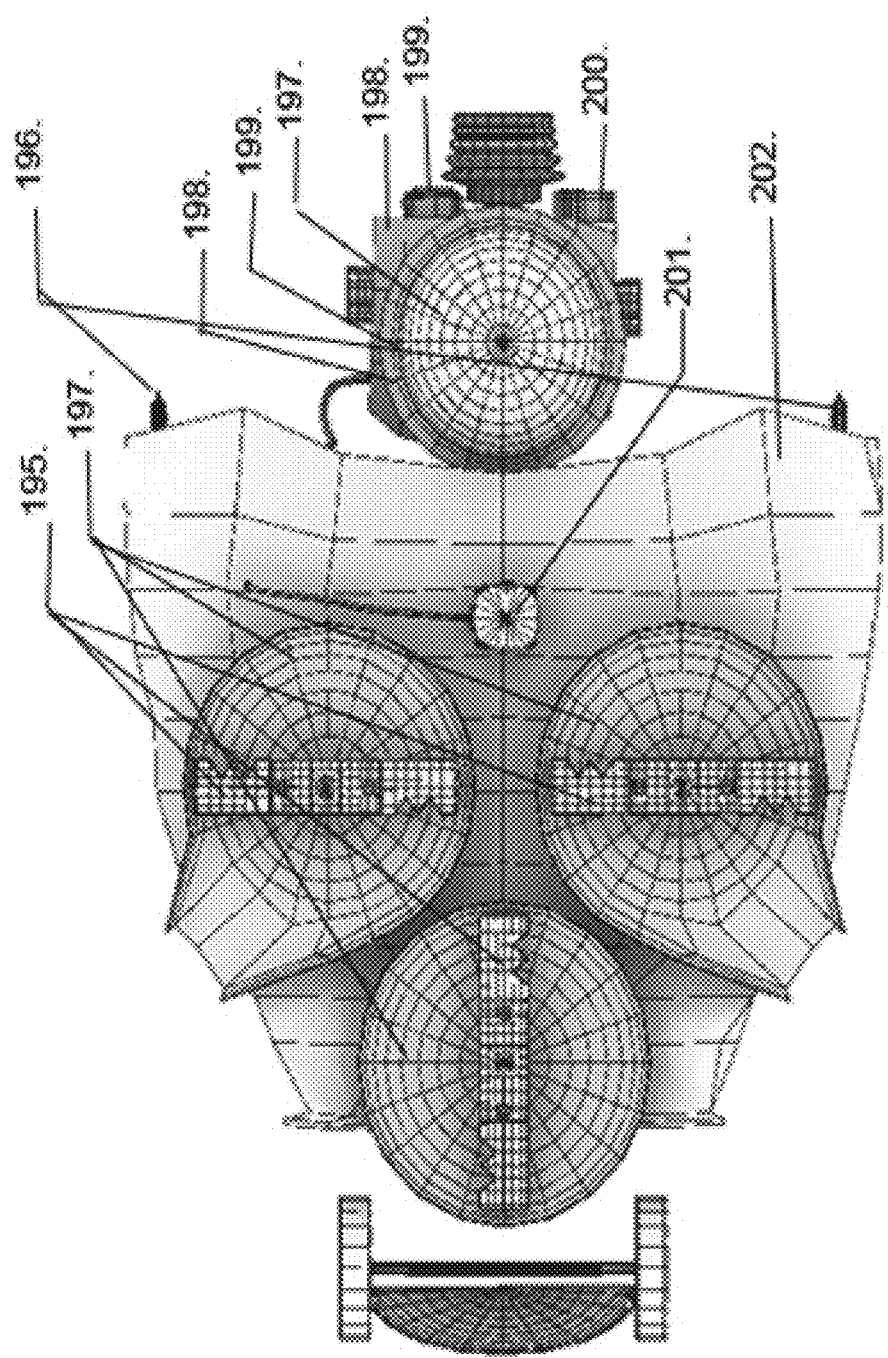

LAWNMOWER WITH TELESCOPING HANDLE

CROSS REFERENCE TO RELATED APPLICATIONS

This application claims priority to and benefit of the following U.S. patent application: U.S. Provisional Patent Application 61/808,411, filed Apr. 4, 2013, invented by Adrienne Kaspar, and entitled "Lawnmower", which is hereby incorporated by reference herein as if fully set forth in its entirety.

BACKGROUND

Prior art lawnmowers can cause some catastrophic injuries to their operators. Such lawnmowers tend to be prone to turning over when used on hillsides. The close proximity of users to conventional lawnmowers during use makes such turnover is exceedingly dangerous. Additionally, conventional lawnmowers are very noisy and emit significant combustion waste products into the atmosphere.

It may be advantageous to provide a lawnmower that is at least one of light weight, easy to use, safer than conventional lawnmowers to operate, low emission, zero emission, has a handle which allows users to more safely operate the lawnmower on inclined surfaces, that does not require internal combustion engines for operation, that includes a backup for driving a set of cutting blades one one of multiple sets of cutting blades experiences a failure, and/or has superior maneuverability due to improved configuration of the portions of the lawnmower the come into contact with the ground.

SUMMARY

In one aspect, a preferred One embodiment of the present invention is directed to a lawnmower including a body having a rear side and a bottom side. A plurality of cutting blades are rotatably positioned on the bottom side. A handle is located on the rear side of the body. The handle clan be connected to the body via a constant velocity joint or other connection. The handle is preferably configured as a single cylindrically shaped member having an adjustable length. The handle may include an outer sleeve having first and second ends. The first end being proximate the body of the lawnmower. An inner sleeve may be slidably located within the outer sleeve and configured to telescope from the second end of the outer sleeve. A hand grip portion can be attached to a portion of the inner sleeve that protrudes from the outer sleeve.

In another aspect the present invention is directed to a lawnmower including a body having a bottom side, a front end, and a rear end. A plurality of cutting blades are rotatably positioned on the bottom side. A roller can be positioned on the bottom side of the body to support the rear end of the lawnmower and is configured to roll as the lawnmower is moved over a surface during operation thereof. The roller is preferably a single roller having a spherical shape and is the only support for the rear end of the lawnmower.

In another aspect, the present invention is directed to a lawnmower including a body having a rear side and a bottom side. A plurality of cutting blades are rotatably positioned on the bottom side. A hydraulic axial piston drives the plurality of cutting blades. A single motor is located within the body of the lawnmower for driving all of the plurality of cutting blades of the lawnmower. The single motor is a hydraulic motor pump such that the lawnmower is operated without using any internal combustion engines and without requiring any conduit to an external power supply.

In another aspect, the present invention is directed to a lawnmower powered exclusively via solar power and driven solely using a single hydraulic motor.

In another aspect, the present invention is directed to a lawnmower having a handle formed by a single cylindrical shaped member of variable length that is moveable about a connection therebetween in any direction relative to the lawnmower.

In another aspect, the present invention is directed to a zero emission lawn mower.

BRIEF DESCRIPTION OF THE DRAWINGS

The above summary, as well as the following detailed description of the preferred embodiments of the present invention, will be understood when read in conjunction with the appended drawings. For the purpose of illustrating the invention, there are shown in the drawings embodiments which are presently preferred.

FIG. 1A is a perspective view of the lawnmower according to a preferred embodiment of the present invention.

FIG. 1E is a front view of the lawnmower of FIG. 1A.

FIG. 1F is a back view of the lawnmower of FIG. 1A.

FIG. 16 is a right side view of the handle of the lawnmower of FIG. 1A.

FIG. 16D is a view of the handle of the lawnmower of FIG. 1A with the inner and outer sleeves cutaway.

FIG. 16G is a side view of the hand grip of the lawnmower of FIG. 16.

FIG. 18 is a back view of the lawnmower of the lawnmower of FIG. 1A without the body or lid.

FIG. 19 is a bottom view of the lawnmower of FIG. 1A.

PARTIAL PARTS LIST

Figure 1B:
FIG. 1B is a top view of the lawnmower of FIG. 1A.
Figure 1C:
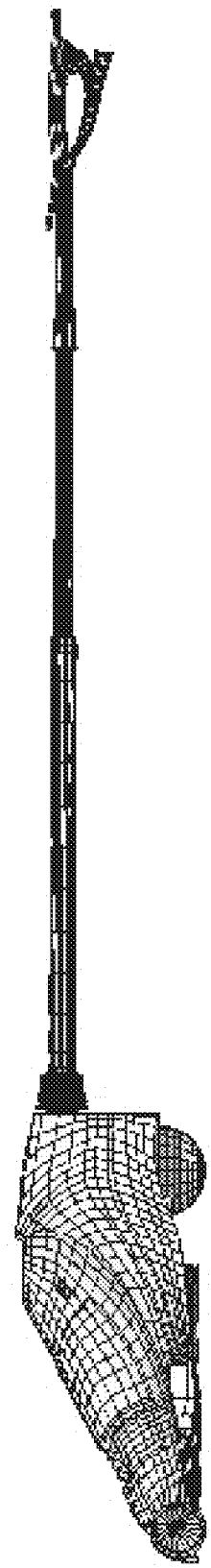
FIG. 1C is a right side view of the lawnmower of FIG. 1A.

The reference numerals not referenced in the below partial parts list are discussed in the detailed description below. The partial parts list is grouped according to Figures in which the part is shown for convenience. Most parts listed herein are shown in additional Figures other than the one under which it is listed. The partial parts list is as follows:

FIGS. 1A-1F:
Six views of a preferred embodiment of a lawnmower according to the present invention showing one preferred shape of the lawnmower.

Figure 1D:
FIG. 1D is a bottom view of the lawnmower of FIG. 1A.
Figure 2:
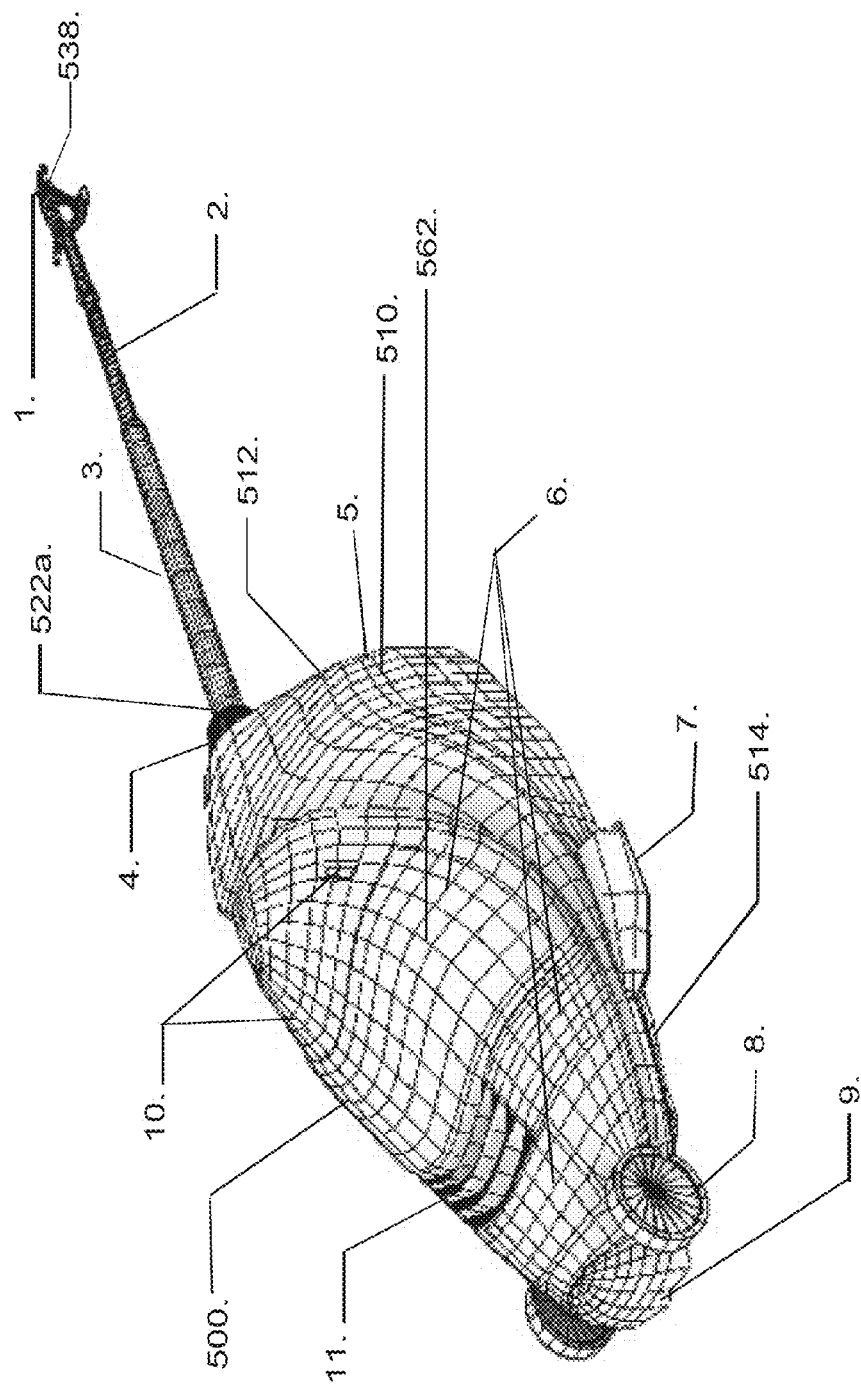
FIG. 2 is a perspective view of the lawnmower of FIG. 1A.

FIG. 2:
Partial parts list for portion(s) of lawnmower of FIGS. 1A-1F shown in this figure:
1. Handle contains touch screen controls, deadman pull ignition switch, trigger switch for handle extension and thumb switch for forward and reverse direction of handle extension.
2. Inner sleeve of extending handle shaft. Sleeve contains a space for electric cable ribbons.
3. Outer sleeve for extending handle shaft. Contains threaded rod stepper motor.
4. Rubber expansion joint, protecting CV style frictionless ball joint.
5. Main body of the mower constructed of bioplastic hemp resin composited for higher impact stiffness such as PLA, PHA or PBS determined by strength and heat requirements.
6. Solar panels (4 total) molded to shape of the lid. There should be a minimum of 33 cells per solar cell necessary for power consumption. Panels are recommended to be crystalline type for high efficiency.
7. Vent for grass clippings.
8. Rubber front wheels 6"-8" in diameter.
9. Front kick plate with teeth for large debris hinged for movement. Used to prevent large material from clogging the blades.
10. Integrated handles molded into the lid for lid removal.
11. Exhaust vent for dual 12v DC solar batteries.

Figure 3:
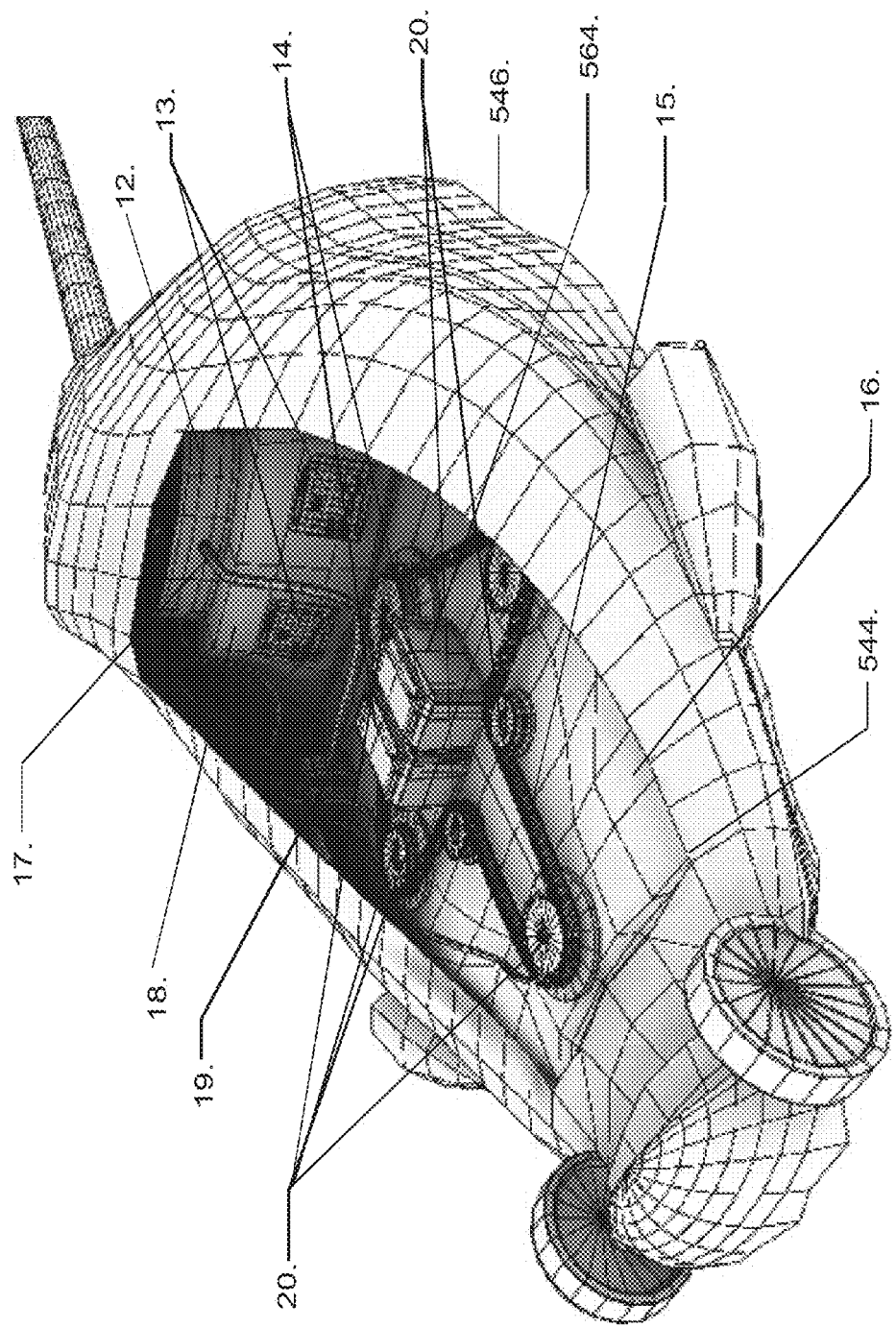
FIG. 3 is a perspective view of the lawnmower of FIG. 1A without the solar panels or lid.

FIG. 3:
Partial parts list for portion(s) of lawnmower of FIGS. 1A-1F shown in this figure:
12. Hydraulic reservoir 4.5-5 liter capacity.
13. Electronic control boards for hydraulic motor and hydraulic clutch, and the dc/ac power convert and emergency shut off switch. Control board connects to Andriod enabled control board in handle FIG. 2-1.
14. Two 12v 70 amp DC solar batteries.
15. Belt.
16. Height adjustable mulching blade chassis. Deck contains hydraulic system, Blade arrays and solar batteries.
17. Hydraulic hose.
18. Upper chassis.
19. Hydraulic 6 port manifold.
20. Drive, shaft, and guide bearings.

Figure 4:
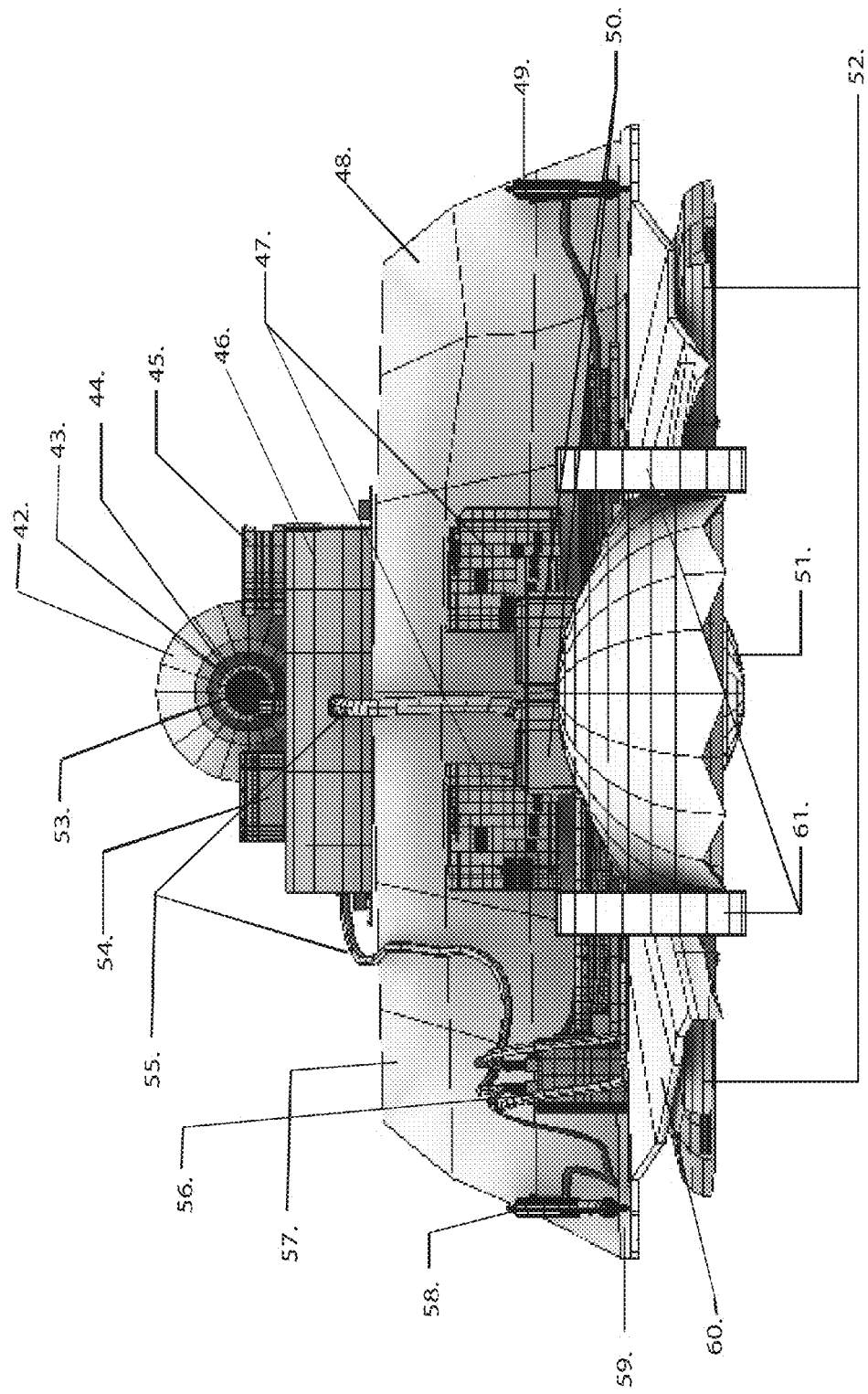
FIG. 4 is a front view of the lawnmower of FIG. 1A without the body or lid.

FIG. 4:
Partial parts list for portion(s) of lawnmower of FIGS. 1A-1F shown in this figure:
42. Back cross section view of the expansion joint.
43. Back view of the mounting plate.
44. Back cross section view of the CV type ball joint.
45. DC/AC power converter with 20 amp outlet.
46. 4.5-5 liter hydraulic fluid reservoir.
47. Electronic control boards for hydraulic motor and hydraulic clutch, dc/ac power convert and emergency shut off switch.
48. Upper chassis. Hydraulic reservoir and gimble packing nut for ball bearing rear wheel mount here.
49. Front view of right side hydraulic cylinder for height adjustment of mulching chassis.
50. Front view of two 12v 70 amp DC solar batteries.
51. Front view of the bottom of the ball bearing rear wheel.
52. Front view of mulching blade enclosure.
53. Front cross section view of the handle outer sleeve.
54. Emergency cut off switch.
55. Hydraulic hose.
56. Front view 6 port hydraulic manifold.
57. Upper chassis.
58. Front view of left side hydraulic cylinder for height adjustment of mulching chassis.
59. Front view of the mulching chassis.
60. Front view of the lower chassis.
61. Front view of the front rubber wheels.

Figure 5:
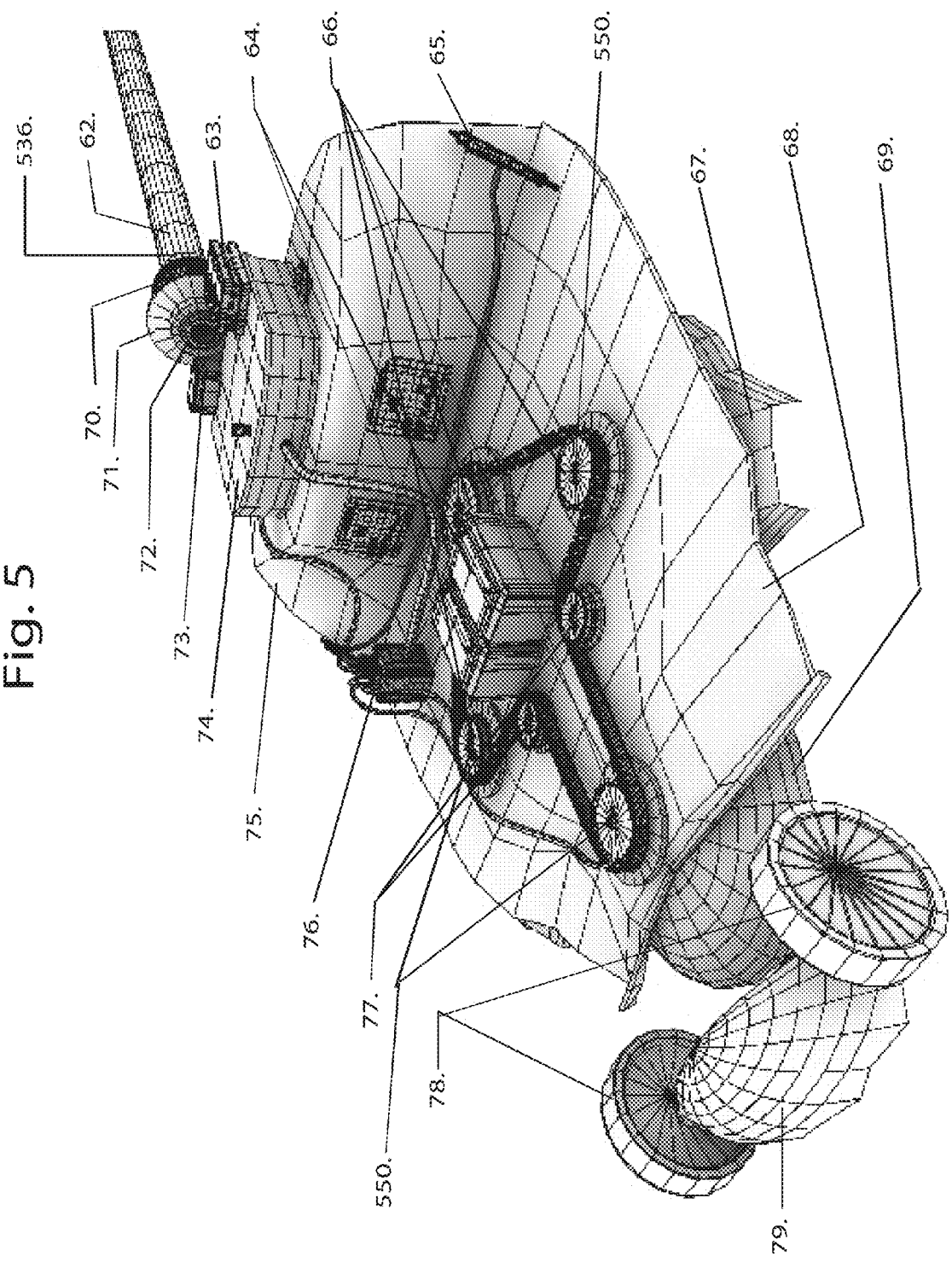
FIG. 5 is a perspective view of the lawnmower of FIG. 1A without the body or lid.

FIG. 5:
Partial parts list for portion(s) of lawnmower of FIGS. 1A-1F shown in this figure:
62. Perspective view of the outer sleeve of the handle.
63. Perspective view of the DC/AC power converter with 20 amp outlet.
64. Perspective view of the 12v 70 amp DC solar batteries.
65. Perspective view of the hydraulic cylinder for mulching deck height adjustment.
66. Perspective view of the drive and shaft bearings.
67. Perspective view of the right side mulching enclosure.
68. Perspective view of the mulching chassis.
69. Perspective view of the front mulching enclosure.
70. Perspective view of the expansion joint.
71. Perspective back view of the CV type ball joint.
72. Perspective view of the CV type ball joint mounting plate.
73. Perspective view of the emergency cut off switch.
74. Perspective view of the hydraulic reservoir.
75. Perspective view of the upper chassis.
76. Perspective view of the hydraulic 6 port manifold.
77. Perspective view of the guide bearings.
78. Perspective view of the front 6"-8" rubber wheels.
79. Perspective view of the front hinged kick plate with teeth for large debris.

Figure 6:
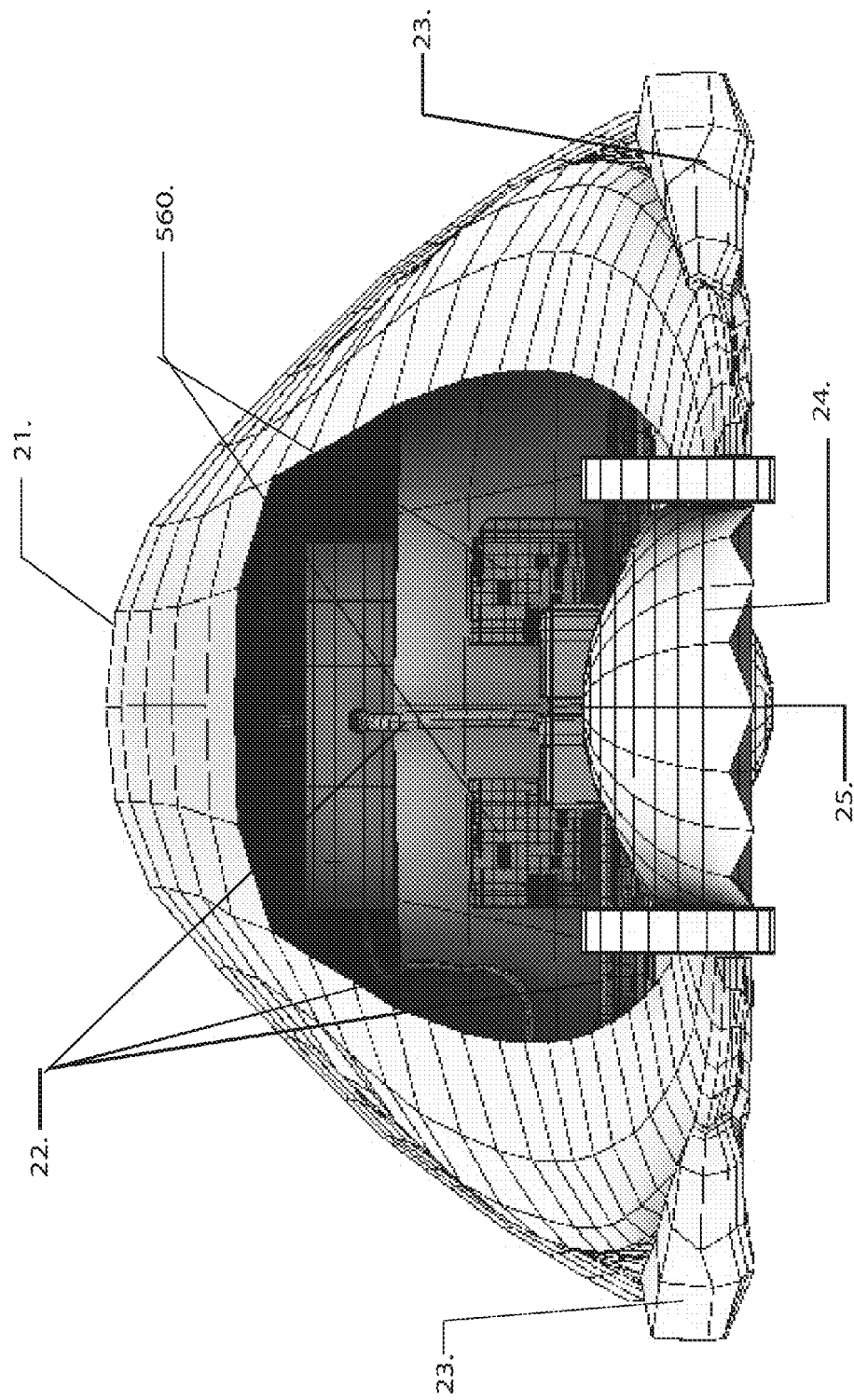
FIG. 6 is a front view of the lawnmower of FIG. 1A without the solar panels or lid.

FIG. 6:
Partial parts list for portion(s) of lawnmower of FIGS. 1A-1F shown in this figure:
- 21. Front view of the main body of the mower.
- 22. Front view of the hydraulic hoses.
- 23. Front view of the right and left side vents for mulched grass clippings, connected to the mulching enclosures which house the mulching blade arrays.
- 24. Front view of the hinged joint kick plate.
- 25. Front view of the bottom of the rear bearing wheel.

Figure 7:
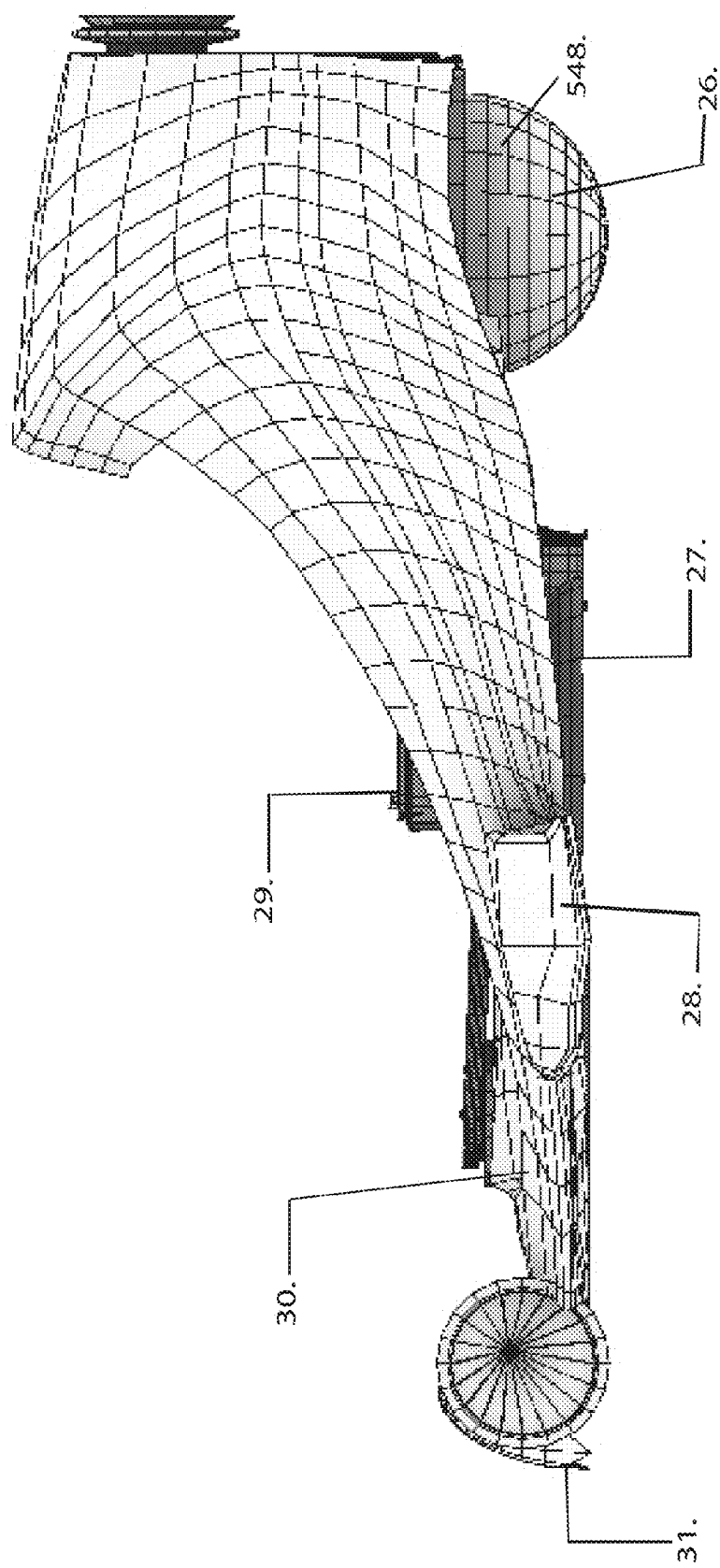
FIG. 7 is a right side view of the lawnmower of FIG. 1A without the solar panels or lid.

FIG. 7:
Partial parts list for portion(s) of lawnmower of FIGS. 1A-1F shown in this figure:
- 26. Side view of the bearing type rear wheel.
- 27. Side view of the mulching blade enclosure in the lowest position.
- 28. Side view of the right side mulched grass clipping vent.
- 29. Side view of the 12V 70 amp DC solar battery.
- 30. Side view of the lower chassis.
- 31. Side view of the front kick plate.

Figure 8:
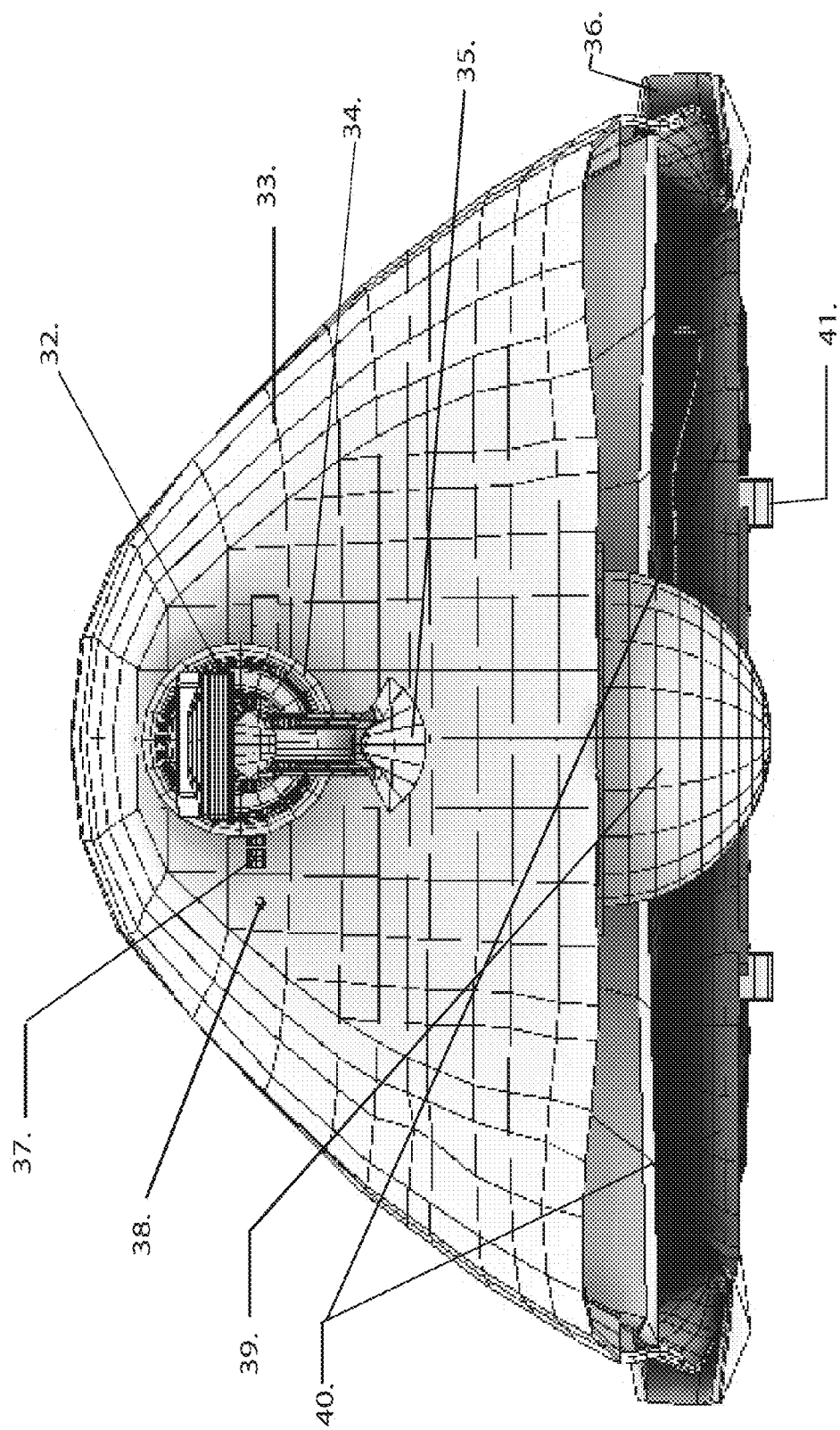
FIG. 8 is a back view of the lawnmower of FIG. 1A.

FIG. 8:
Partial parts list for portion(s) of lawnmower of FIGS. 1A-1F shown in this figure:
- 32. Front view of the expansion joint.
- 33. Front view of the Emergency shut off button as it protrudes from the back of the body of the mower.
- 34. Front view of the CV type ball joint mounting plate.
- 35. Front view of the handle.
- 36. Back view of the left side mulched grass clipping vent.
- 37. Front view of the ac 20 amp outlet for battery charging.
- 38. On/off switch for ac 20 amp outlet.
- 39. Back view of the rear bearing wheel.
- 40. Back view of the mulching blade enclosure.
- 41. Back view of the front rubber wheels.

Figure 9:
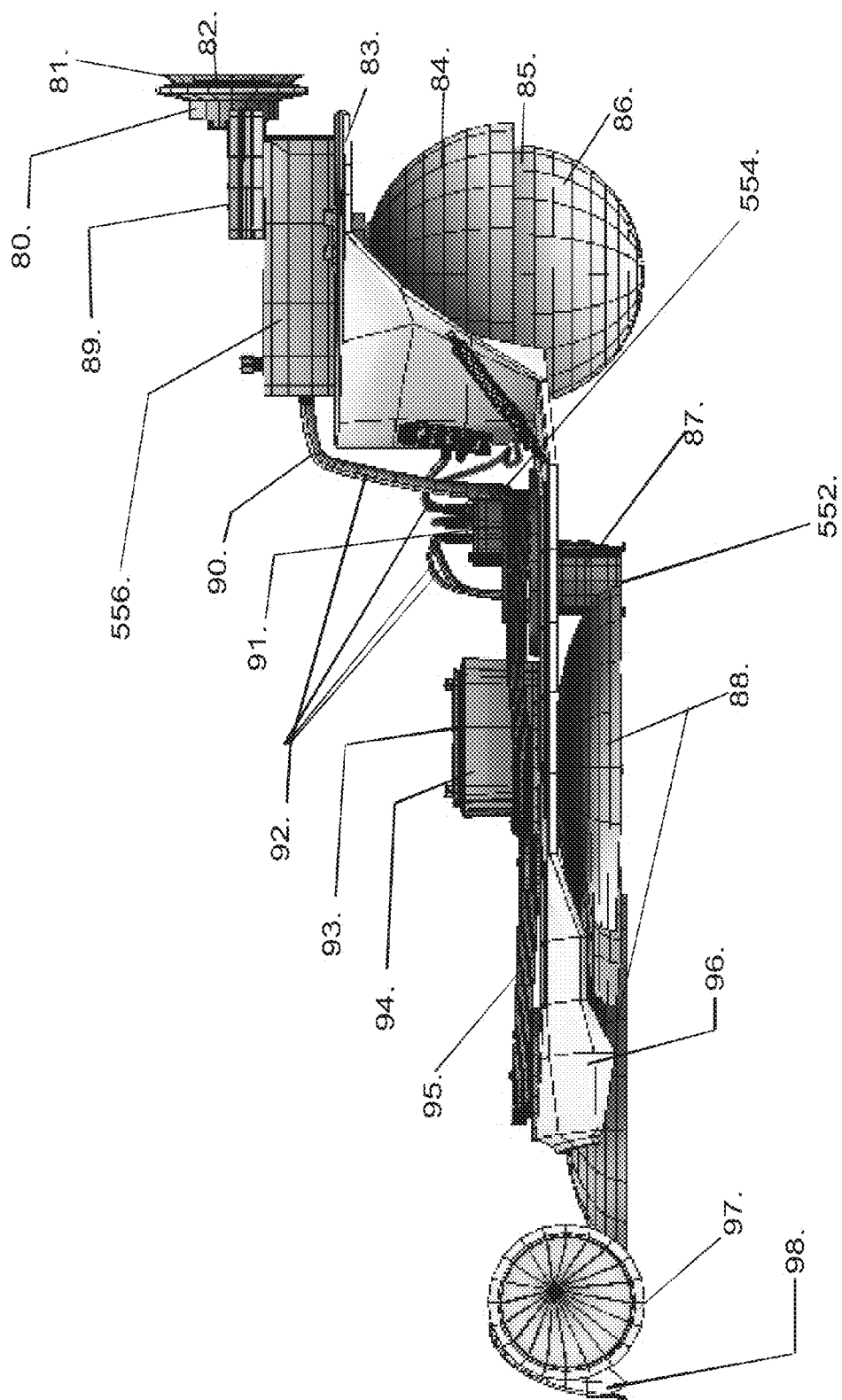
FIG. 9 is a right side view of the lawnmower of FIG. 1A without the body or lid.

FIG. 9:
Partial parts list for portion(s) of lawnmower of FIGS. 1A-1F shown in this figure:
- 80. Side view of the CV type ball joint housing.
- 81. Side view of the expansion joint.
- 82. Side view of the CV type ball joint mounting plate.
- 83. Cut away side view of the upper chassis.
- 84. Side view of the rear bearing wheel housing.
- 85. Side view of the Teflon (or hard plastic) gasket between the housing and the bearing wheel.
- 86. Hard plastic or composite, smooth surfaced bearing wheel 12"-14" diameter.
- 87. Side view 3 hp hydraulic motor/pump.
- 88. Side view or right side mulching enclosure.
- 89. Side view of the DC/AV power converter with 20 amp outlet.
- 90. Side view of the hydraulic hose.
- 91. Side view of the hydraulic 6 port manifold.
- 92. Side view of the hydraulic hoses attached to the manifold.
- 93. Side view of the mulching chassis.
- 94. Side view of the 12V 70 amp DC solar batteries.
- 95. Side view of the belt.
- 96. Side view of the lower chassis.
- 97. Side view of the right side front rubber wheel.
- 98. Side view of the front kick plate.

Figure 10:
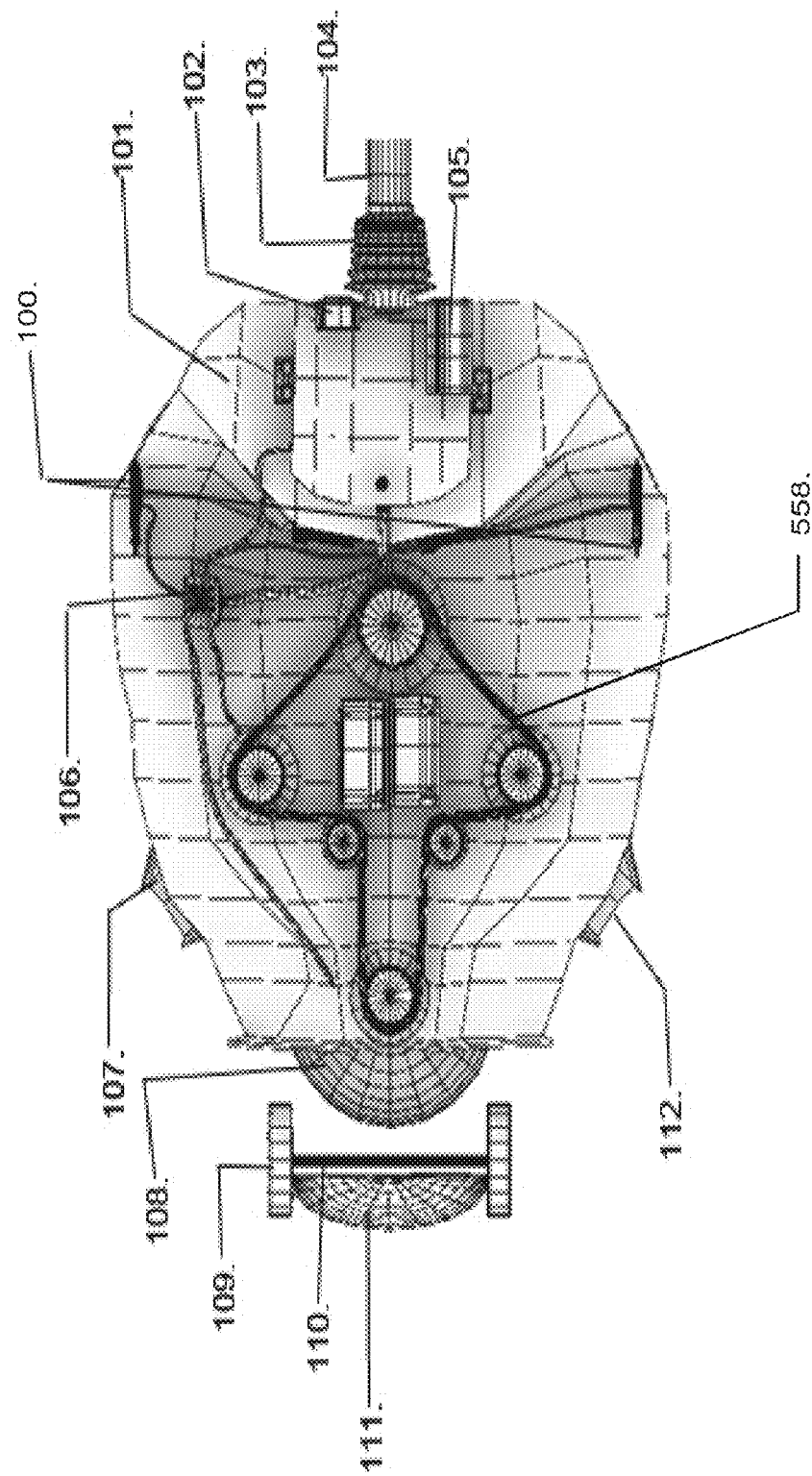
FIG. 10 is a top view of the lawnmower of FIG. 1A without the body or lid.

FIG. 10:
Partial parts list for portion(s) of lawnmower of FIGS. 1A-1F shown in this figure:
- 100. Top view of the hydraulic cylinders that control the height of the mulching chassis.
- 101. Top view of the upper chassis.
- 102. Top view of the emergency shut off switch.
- 103. Top view of the expansion joint.
- 104. Top view of the handle outer sleeve.
- 105. Top view of the hydraulic reservoir.
- 106. Top view of the 6 port hydraulic manifold.
- 107. Top view of the left side mulching enclosure as it protrudes beneath the mulching chassis.
- 108. Top view of the front mulching enclosure as it protrudes beneath the mulching chassis.
- 109. Top view of the front rubber wheels.
- 110. Top view of the front rubber wheel shaft.
- 111. Top view of the front kick plate.
- 112. Top view of the right side mulching enclosure as it protrudes beneath the mulching chassis.

Figure 11:
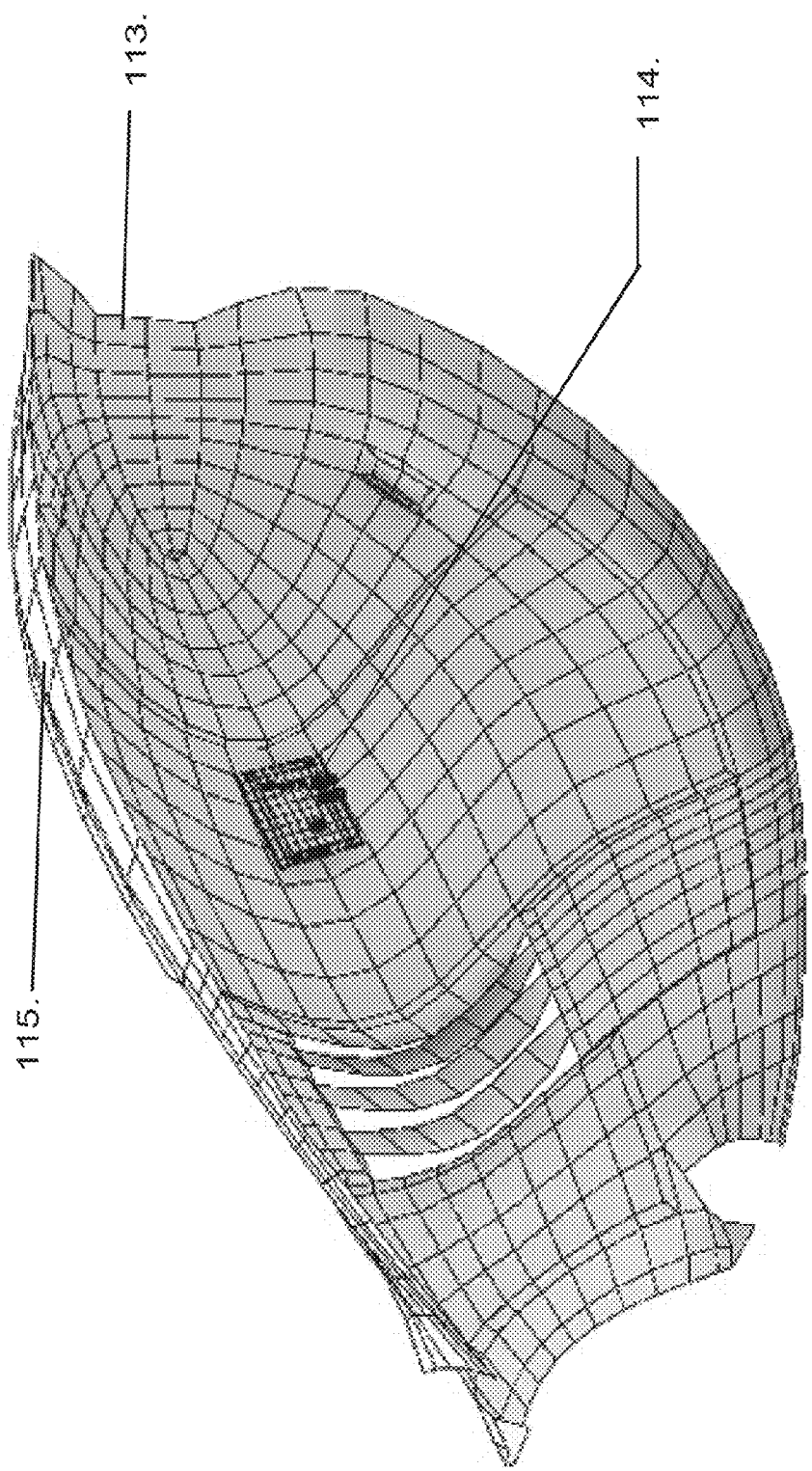
FIG. 11 is the underside of the lid of the lawnmower of FIG. 1A.

FIG. 11:
Partial parts list for portion(s) of lawnmower of FIGS. 1A-1F shown in this figure:
- 113. Underside of the Lid.
- 114. Electronic voltage converter control board.
- 115. Front edge of lid solar panel.

Figure 12:
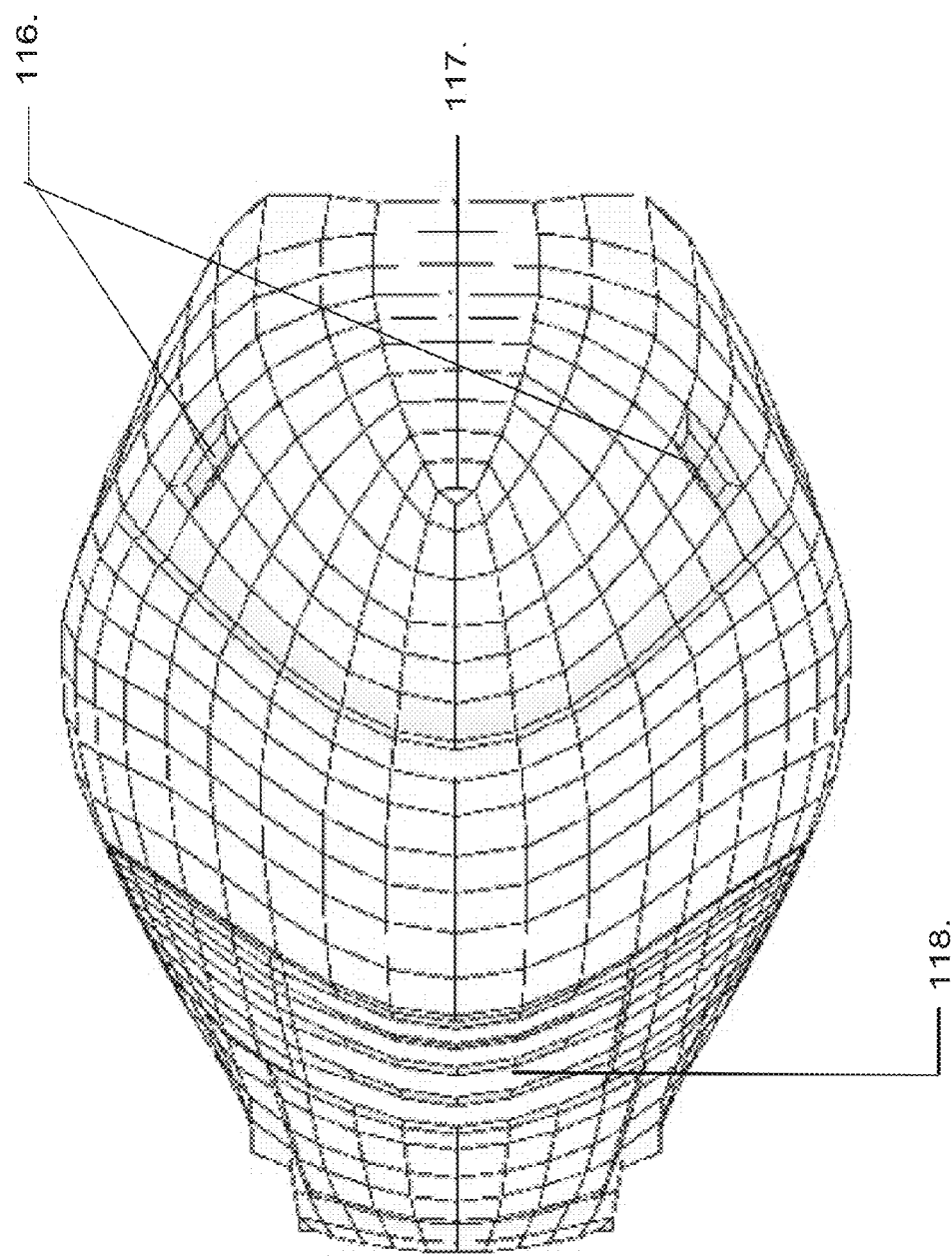
FIG. 12 is a top view of the lid of the lawnmower of FIG. 1A.

FIG. 12:
Partial parts list for portion(s) of lawnmower of FIGS. 1A-1F shown in this figure:
- 116. Top view of the integrated handle in the lid.
- 117. Top view of the lid.
- 118. Top view of the integrated vent in the lid.

Figure 13:
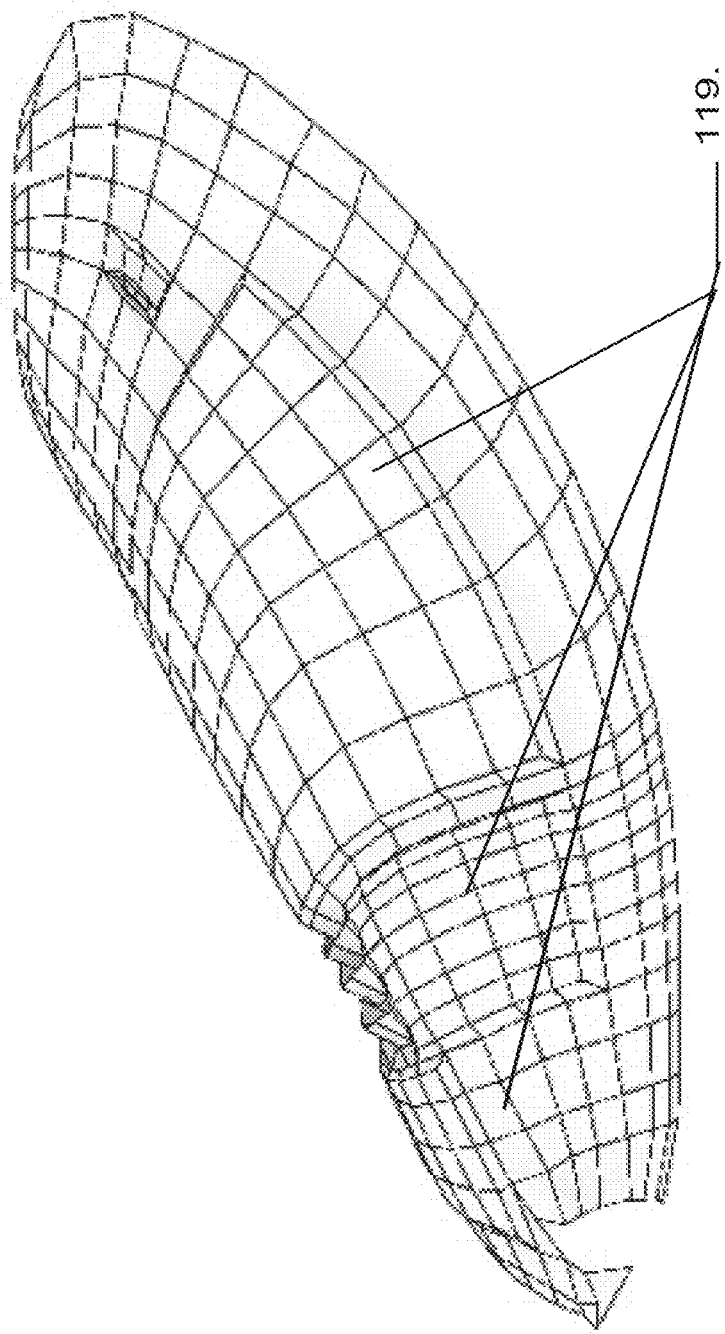
FIG. 13 is a side view of the lid and solar panels of the lawnmower of FIG. 1A.

FIG. 13:
Partial parts list for portion(s) of lawnmower of FIGS. 1A-1F shown in this figure:
- 119. Side view of Solar Panel on lid.

Figure 14:
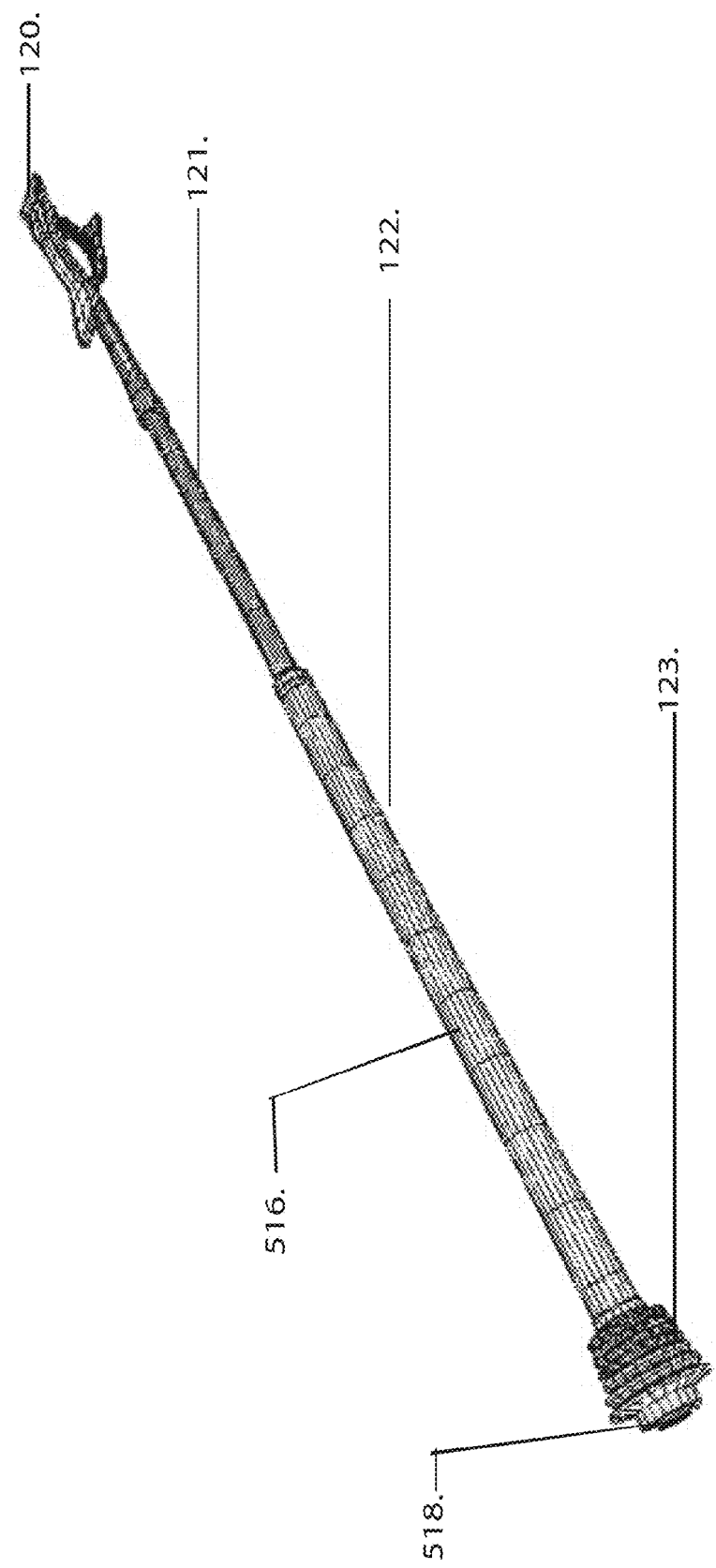
FIG. 14 is a perspective view of the handle of the lawnmower of FIG. 1A.

FIG. 14:
Partial parts list for portion(s) of lawnmower of FIGS. 1A-1F shown in this figure:
- 120. Perspective view of the handle.
- 121. Perspective view of the inner sleeve of the handle.
- 122. Perspective view of the outer sleeve of the handle.
- 123. Perspective view of the expansion joint on the handle.

Figure 15:
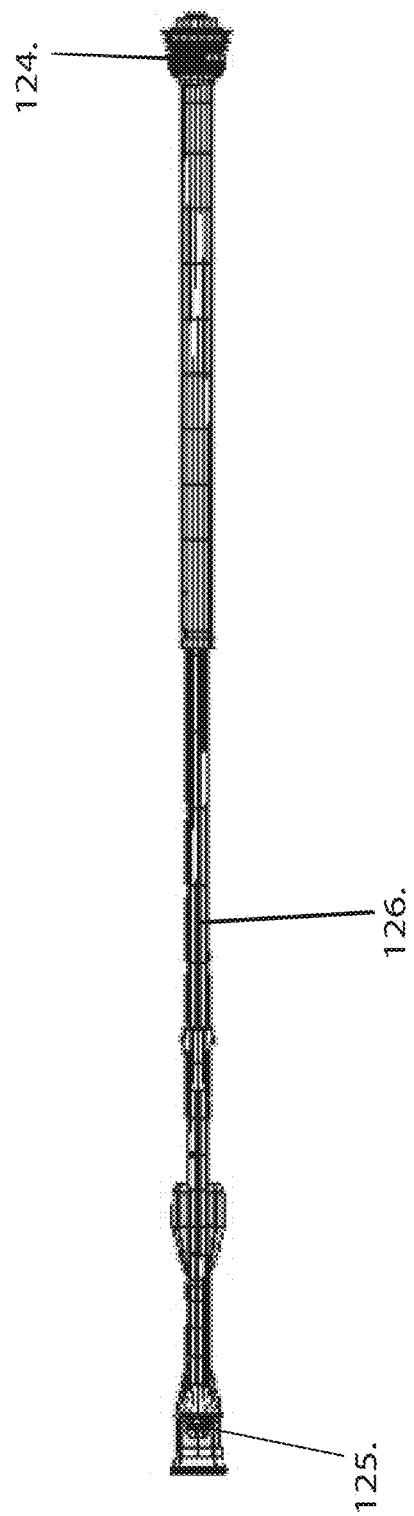
FIG. 15 is a top view of the handle of the lawnmower of FIG. 1A.
Figure 16A:
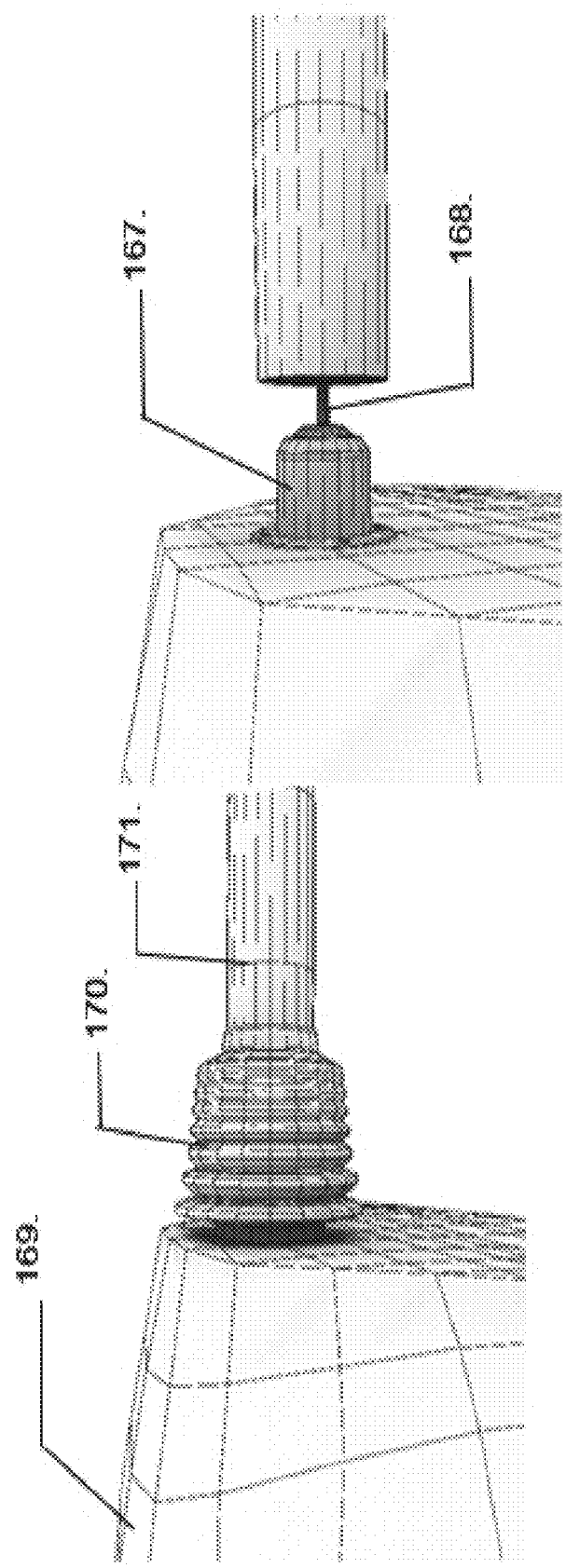
FIG. 16A is a zoomed side view of where the handle attaches to the body of the lawnmower of FIG. 1A.
Figure 16B:
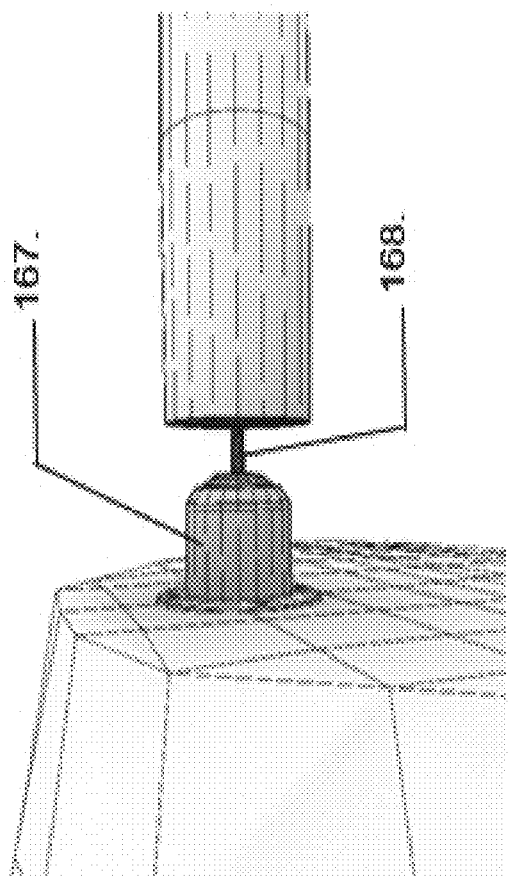
FIG. 16B is a zoomed side view of the handle attaching to the body of the lawnmower of FIG. 1A without the expansion joint.
Figure 16C:
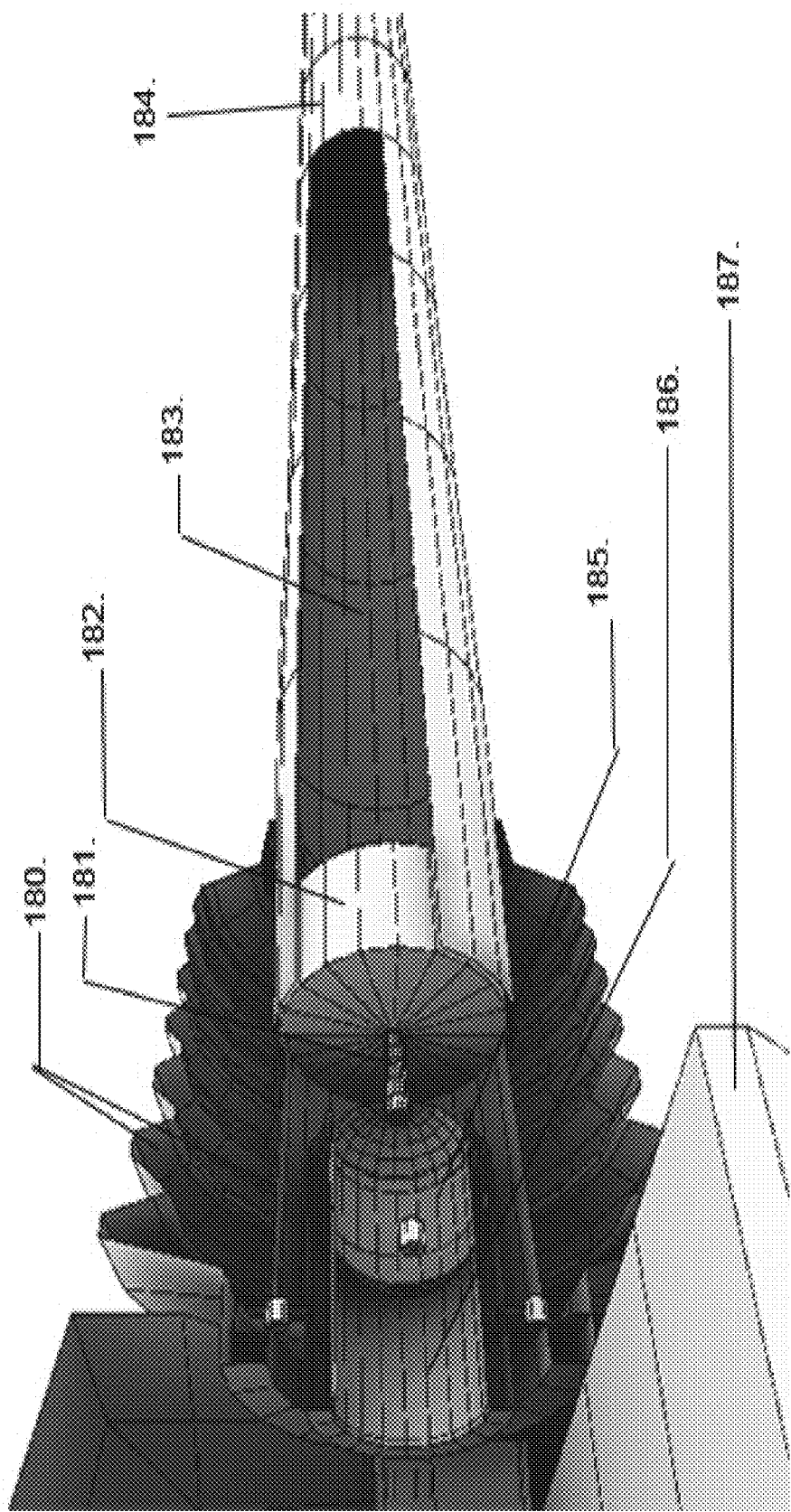
FIG. 16C is a cutaway view of the handle attaching to the body of the lawnmower of FIG. 1A.
Figure 16E:
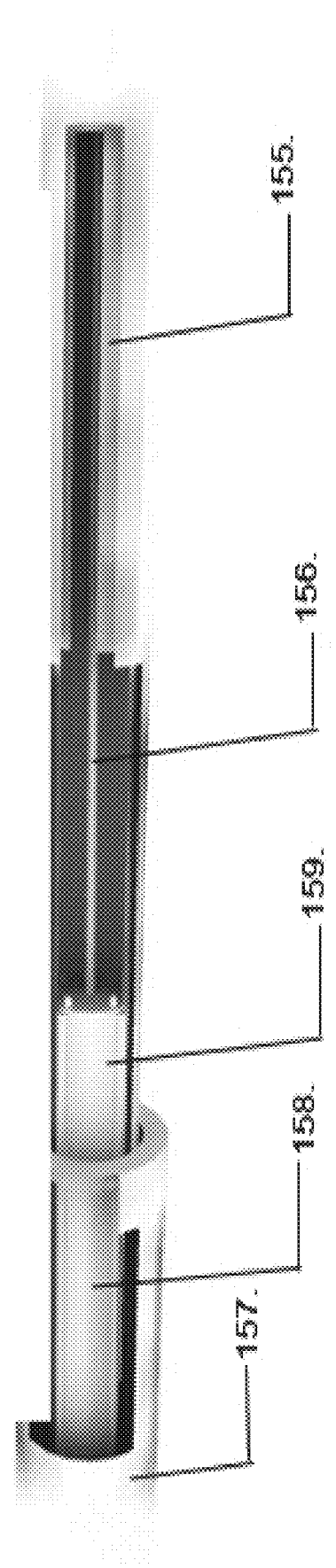
FIG. 16E is a view of the handle of the lawnmower of FIG. 1A with the inner and outer sleeves cutaway.
Figure 16F:
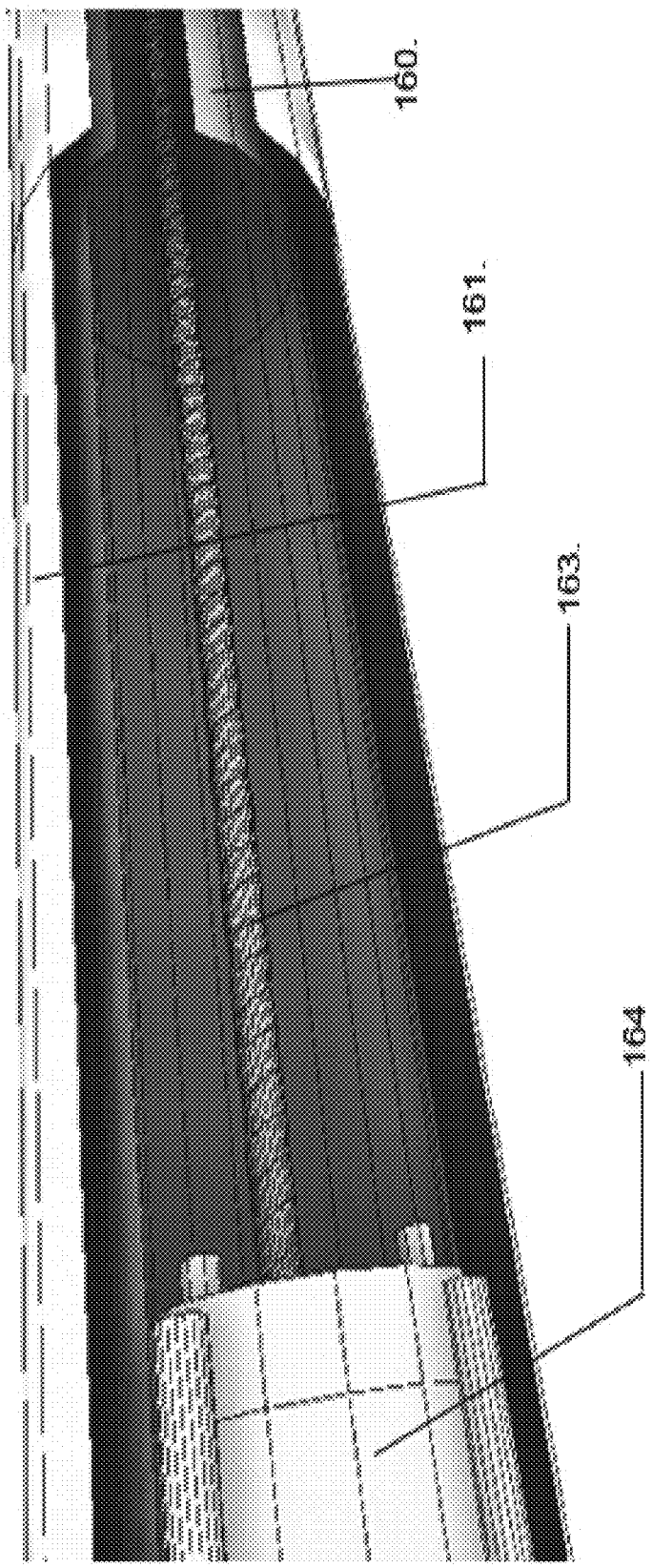
FIG. 16F is a zoomed perspective view of the lawnmower of FIG. 16E.
Figure 16H:
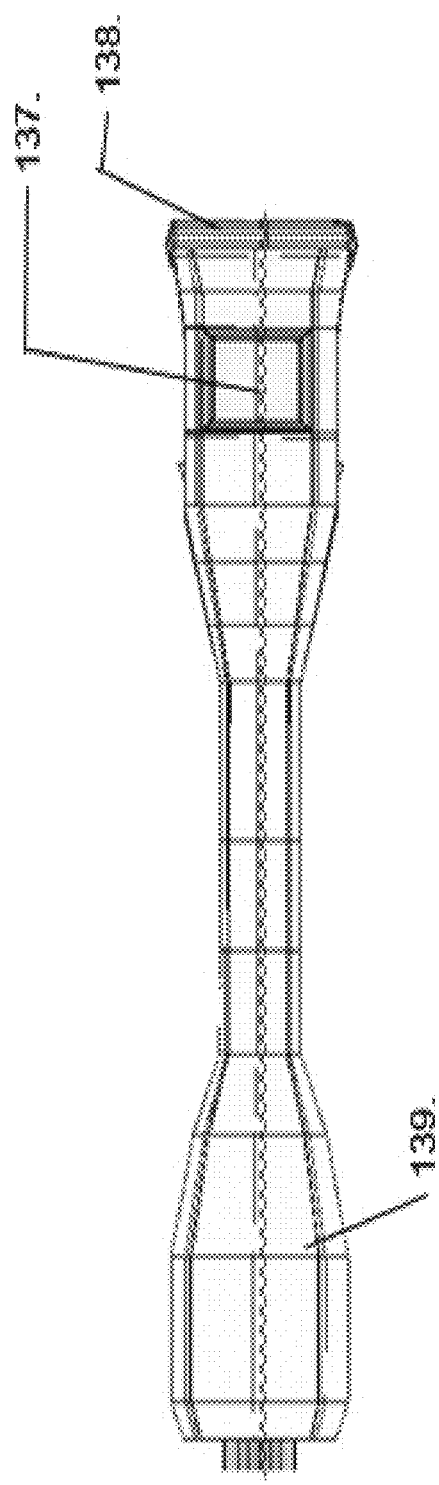
FIG. 16H is a top view of the hand grip of the lawnmower of FIG. 16.
Figure 16I:
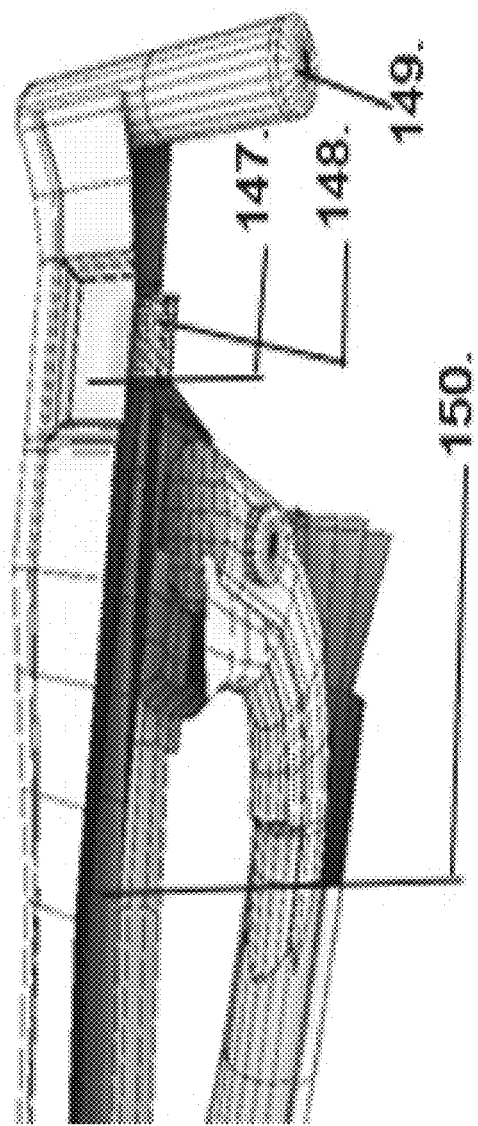
FIG. 16I is a perspective view of the hand grip of the lawnmower of FIG. 16.
Figure 16J:
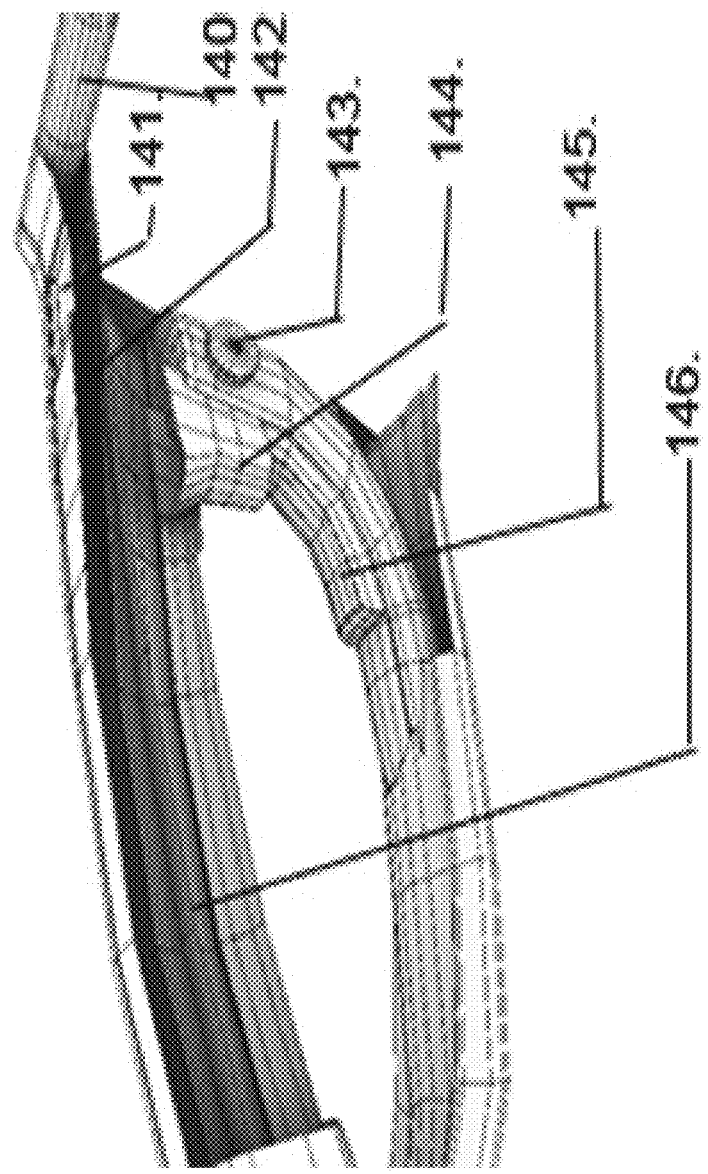
FIG. 16J is a perspective view of the hand grip of the lawnmower of FIG. 16 with a cutaway of the handle.

FIG. 15:
Partial parts list for portion(s) of lawnmower of FIGS. 1A-1F shown in this figure:
- 124. Top view of the handle expansion joint.
- 125. Top view of the handle, showing the android enabled touch screen readout.
- 126. Top view of the telescoping handle shaft composed of the inner sleeve and the outer sleeve.

FIGS. 16, 16A, 16B, 16C, 16D, 16E, 16F:
Partial parts list for portion(s) of lawnmower of FIGS. 1A-1F shown in this figure:
- 131. Side view of handle arm guard with grip.
- 132. Side view of handle arm guard foam rubber guard for protection of hand gripping the handle.
- 133. Side view of handle thumb button for forward/reverse stepper motor control.
- 134. Side view of handle trigger button for actuation of handle extension.
- 135. Side view of handle for deadman grip button for start/stop of hydraulic motor controlling the mulch blade assemblies.
- 136. Side view of handle shaft.
- 137. Top view of the handle integrated, Android enabled touch screen readout panel.
- 138. Top view of the handle arm guard foam rubber guard.
- 139. Top view of the handle arm guard hand grip.
- CS a. Cross section line indicating direction of cross section views PV 1. and PV 2.
- 140. Perspective side view of arm guard rubber guard.
- 141. Perspective side view of touch screen readout.

Figure 17:
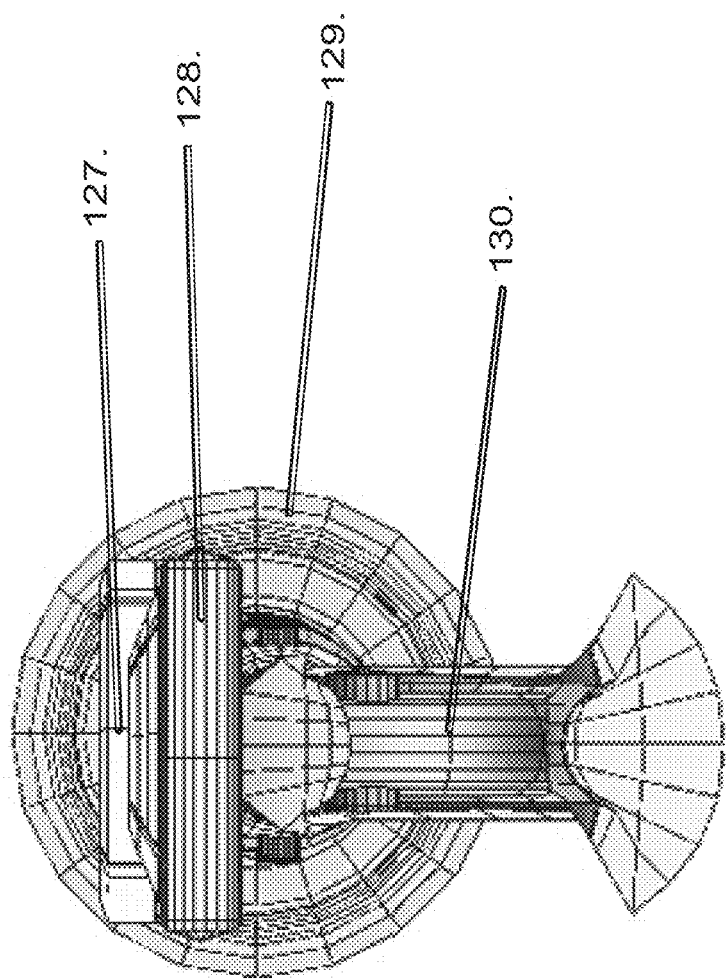
FIG. 17 is a front view of the handle of the lawnmower of FIG. 16.
Figure 18A:
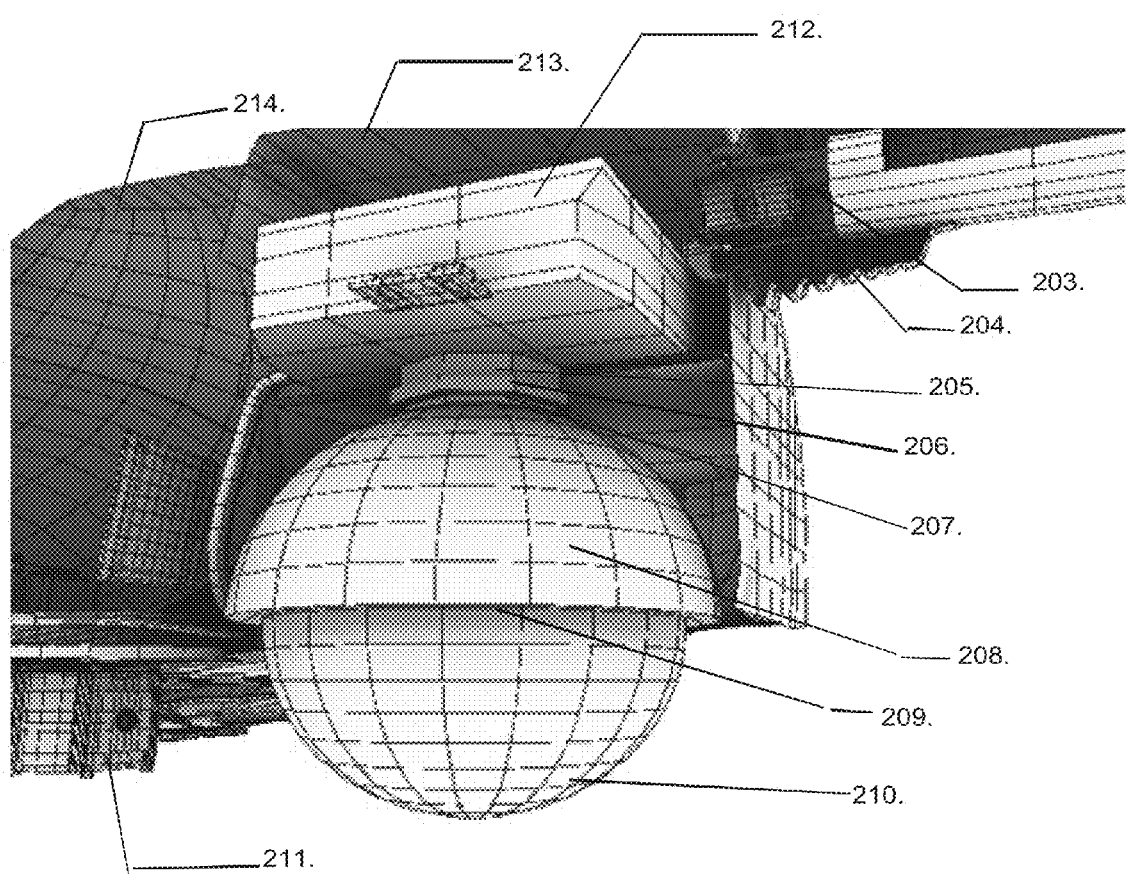
FIG. 18A is a side view of the lawnmower of FIG. 1A zoomed in on the rear bearing wheel and rear bearing wheel housing.
Figure 20:
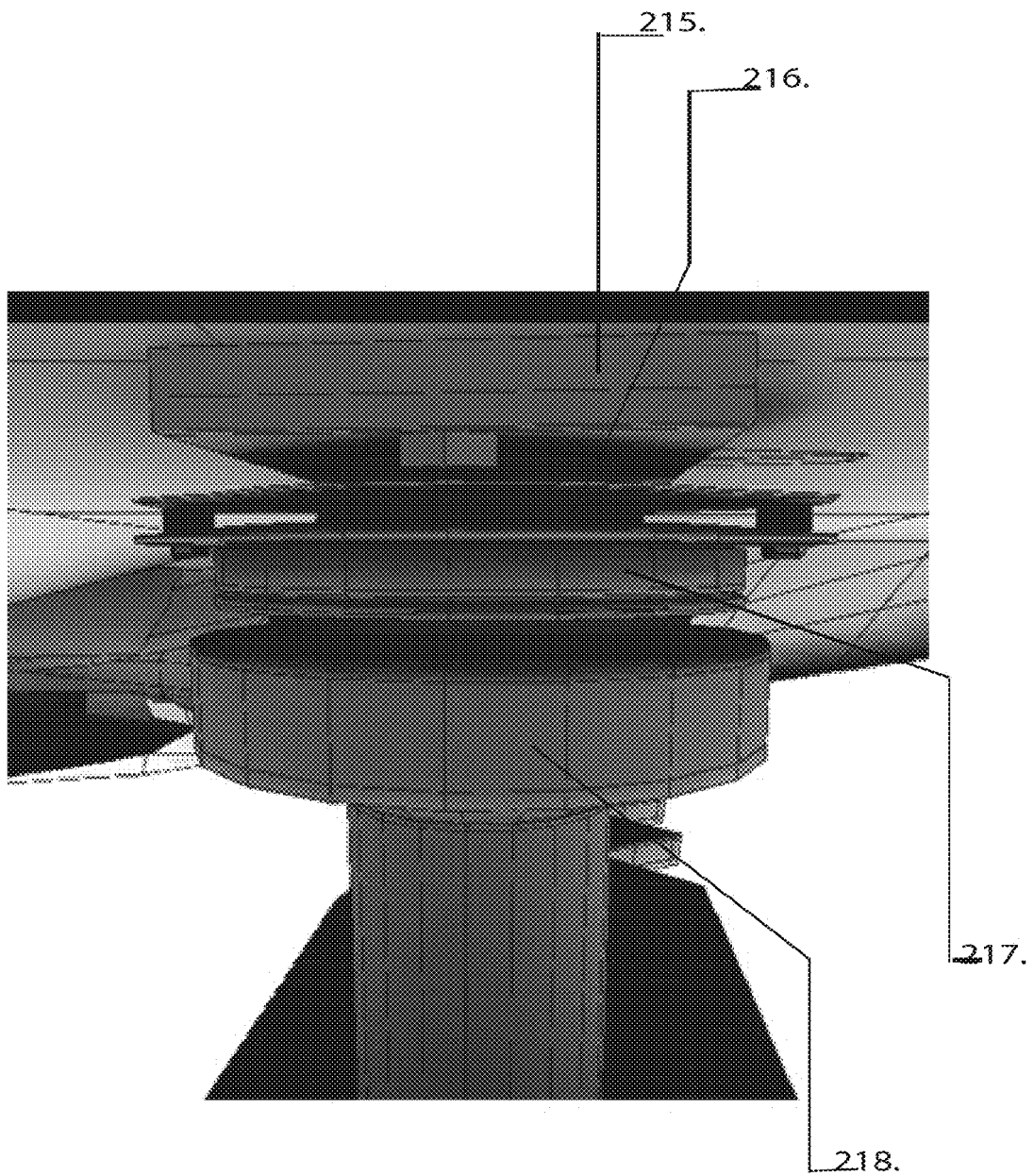
FIG. 20 is a side view of the connection between the mulching blade and the hydraulic axial piston of the lawnmower of FIG. 1A.

142. Perspective side view of hollow cavity for control board ribbon cable.
143. Perspective side view of handle thumb button for controlling the forward/reverse direction of the threaded rod stepper motor that controls the extension/retraction of the handle shaft.
144. Perspective side view of the deadman grip button.
146. Perspective side view cut away of the handle,
147. Perspective top view of integrated Android enabled touch screen readout with control board revealed below.
148. Android enabled control board for touch screen readout.
149. Perspective top view of handle arm guard foam rubber guard.
150. Hollow cavity in handle for control board ribbon cable.
151. Cut away side view of the inner handle sleeve revealing hollow compartment for ribbon cables.
152. Cut away side view of the inner handle sleeve revealing ⅜th in dia. threaded rod.
153. Side view of the handle outer sleeve.
154. Cut away side view of the inner and outer handle sleeves revealing the ⅜th in dia. threaded rod stepper motor with speed and direction control.
155. Render view showing inner cavity of inner handle sleeve.
156. Render view of ⅜th in. dia. threaded rod.
157. Render view of handle outer sleeve cut away.
158. Render view of handle outer sleeve cut away revealing stepper motor.
159. Render view of stepper motor.
160. Zoom perspective view of Inner sleeve cable cavity.
161. Inner sleeve.
163. Zoom perspective view of threaded rod.
164. Zoom perspective view of the threaded rod motor.
167. CV type frictionless ball joint for attaching the handle to the body of the mower for universal range of motion.
168. Shaft bolt of CV type ball joint.
169. Side view of the rear of the body of the mower, where handle attaches.
170. Zoomed side view of expansion joint the encases the CV type ball joint.
171. Zoomed side view of outer handle sleeve.
180. Cut away view of expansion joint.
181. Cut away view of ball joint shaft bolt.
182. Cut away view of outer sleeve end mounting plate for ball joint shaft bolt.
183. Cut away view of outer sleeve cavity for threaded rod in "closed "retracted position.
184. Handle outer sleeve.
185. Ball joint shaft bolt secure nut.
186. Housing for ball of ball joint.
187. Cut away view of DC/AC power converter with 20 amp outlet.
FIG. 17:
Partial parts list for portion(s) of lawnmower of FIGS. 1A-1F shown in this figure:
127. Front view of handle android enabled display.
128. Front view of foam rubber hand guard integrated into handle.
129. Front view of handle expansion joint.
130. Front cut away view of trigger buttons.
FIGS. 18, 18A:
Partial parts list for portion(s) of lawnmower of FIGS. 1A-1F shown in this figure:
188. Bearing collar mount for attaching rear wheel bearing housing to the upper chassis of the mower.
189. Gasket seal to bearing housing.
190. Bearing wheel housing.
191. Bearing wheel that functions like a frictionless caster wheel.
192. Back cut away view of hydraulic cylinders that control the height of the mulching chassis.
193. Back cut away view of the right and left mulching enclosures.
194. Back cut away view revealing the bottom of the front rubber wheels.
203. Cut away side view of ball joint shaft bolt as attached to handle end mounting plate.
FIG. 19:
Partial parts list for portion(s) of lawnmower of FIGS. 1A-1F shown in this figure:
195. 12" mulching blades.
196. Bottom cut away view of hydraulic cylinders for mulching chassis height adjustment.
197. Bottom view of rear bearing wheel.
197. Bottom view of mulching blade enclosure.
198. Bottom cut away view of the hydraulic reservoir tank. Note that the upper chassis is not depicted.
199. Bottom cut away view of DC/AC power converter.
200. Bottom cut away view of emergency shut off switch.
201. Bottom view of 3 hp nautical hydraulic motor/pump reverse mount.
202. Bottom cut away view of the mulching chassis.
204. Cut away side view of ball in CV type ball joint.
205. Side view of the bearing collar mount for attaching rear wheel bearing housing to the upper chassis of the mower.
206. Bearing collar nut.
207. Rubber gasket.
208. Side view of bearing wheel housing.
209. Teflon or hard plastic gasket between bearing wheel and bearing wheel housing.
210. Side view of Rear bearing wheel.
211. Cut away back view of 3 hp hydraulic motor/pump.

DETAILED DESCRIPTION OF THE PREFERRED EMBODIMENTS

Certain terminology is used in the following description for convenience only and is not limiting. The words "rear", "front", "bottom", "outer" and/or "outwardly" refer to directions away from or to a location on an outer surface relative to the geometric center of the referenced element and designated parts thereof. Additionally, the words "a" and "one" are defined as including one or more of the referenced item unless specifically stated otherwise. The terminology includes the words above specifically mentioned, derivatives thereof, and words of similar import.

Briefly speaking, the present invention is directed to a lawnmower 500 that is simpler to use than prior art lawnmower's and which may contain any one or combination of new technological features to facilitate use thereof.

Referring to FIG. 2, the lawnmower 500 has a body 510 with a rear side 512 and a bottom side 514. The body 510 is preferably formed of a light weight, sturdy, strong material, such as a polymer. More specifically, it is preferred that the body 510 is formed of composite material potentially formed of bio plastic hemp resin or the like. Those of ordinary skill in the art will appreciate from this disclosure that any suitable material can be used to form the body 510 without departing from the scope of the present invention.

It is preferred, but not necessary, that the body 510 have an aerodynamic configuration as shown in FIGS. 1A-1F and FIGS. 11-13. Referring specifically to FIGS. 1A and 2, the upper front side of the lawnmower 500 preferably has a gentle upward slope with curved sides. Additionally, vents are preferably located in the front top surface that are angled so as not to disturb the flow of air over the lawnmower 500.

As shown in FIG. 1D, a plurality of cutting blades are rotatably positioned on the bottom side 514 of the lawnmower 500. It is preferred, but not necessary, that the cutting blades are grouped into three separate sets that each revolve around a different vertical axis. However, those of ordinary skill in the art will appreciate that any number of sets of cutting blades can be used without departing from the present invention. As such, a single set of cutting blades can be used with the lawnmower 500 without departing from the scope of the claimed invention.

Referring to FIGS. 4, 10, 14, and 16A3, a handle 516 may be located on the rear side 512 of the body 510 of the lawnmower 500. The handle 516 is preferably connected to the body 510 via a constant velocity joint 518. Those of ordinary skill in the art will appreciate that any other suitable joint can be used instead of a constant velocity joint without departing from the scope of the present invention. One unexpected advantage of incorporating a constant velocity joint with the handle 516 is the ability to maintain eye handgrip 538 of the handle 516 in an upright position even when the lawnmower 500 is mowing on an angled surface. That is, the handle 516 is capable of rotating about its longitudinal axis as needed to maintain comfort. The constant velocity joint 518 also allows the single cylindrically shaped member to be moved and to pivot about the connection 536 to the body 510 in any one of a vertical direction and a horizontal direction relative to the body 510 of the lawnmower 500. Explained another way, the constant velocity joint allows the single cylindrically shaped member to be moved and to pivot about the connection 536 to the body 510 through approximately three hundred sixty degrees (360°) relative to the body of the lawnmower.

The handle 516 is preferably configured as a single cylindrically shaped member having an adjustable length. What is meant in the claims by a "single cylindrically shaped member" is that the handle 516 is preferably in the shape of a single pole and does not involve a second rod or strut that is also connected to the lawnmower 500. The term does not imply that the handle is formed as a single piece and is defined as encompassing of multiple sleeved structure such as that described below and that shown in FIG. 21.

Figure 21:
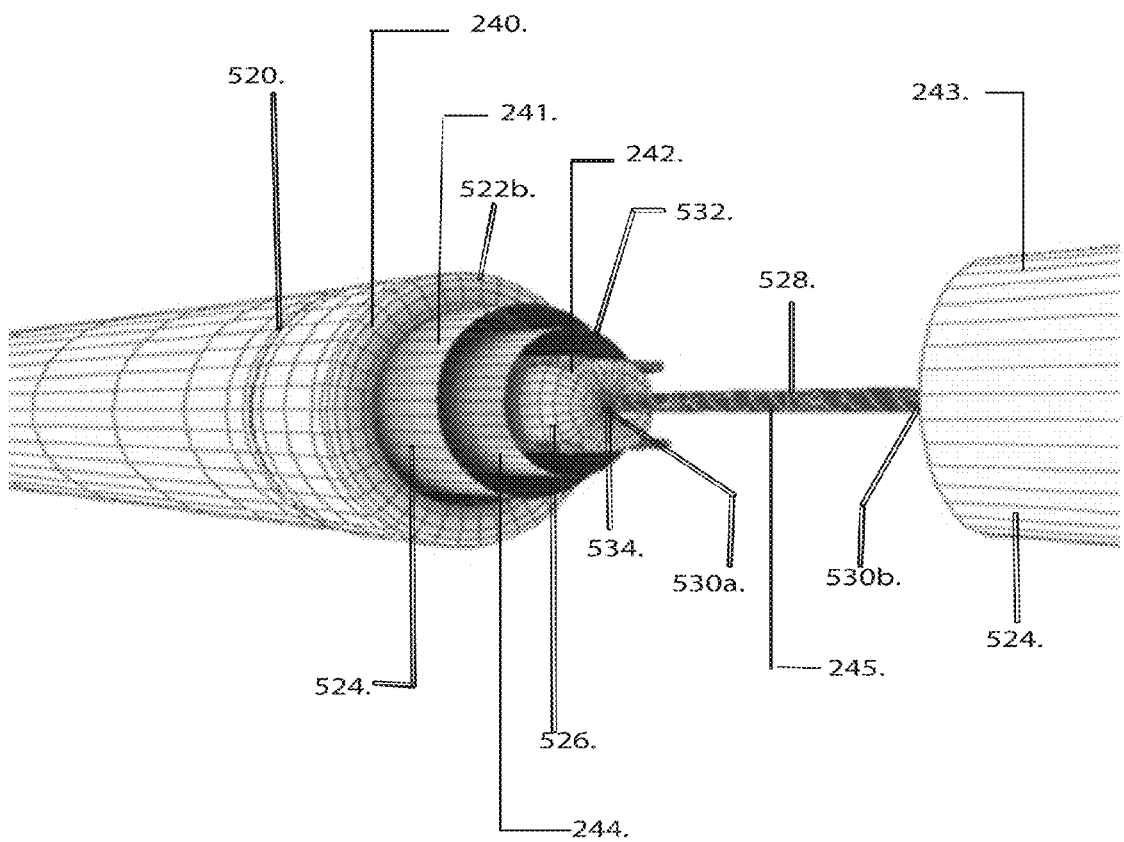
FIG. 21 is a perspective view showing the inner sleeve detached from the outer sleeve of the handle of the lawnmower of FIG. 1A.
Figure 22:
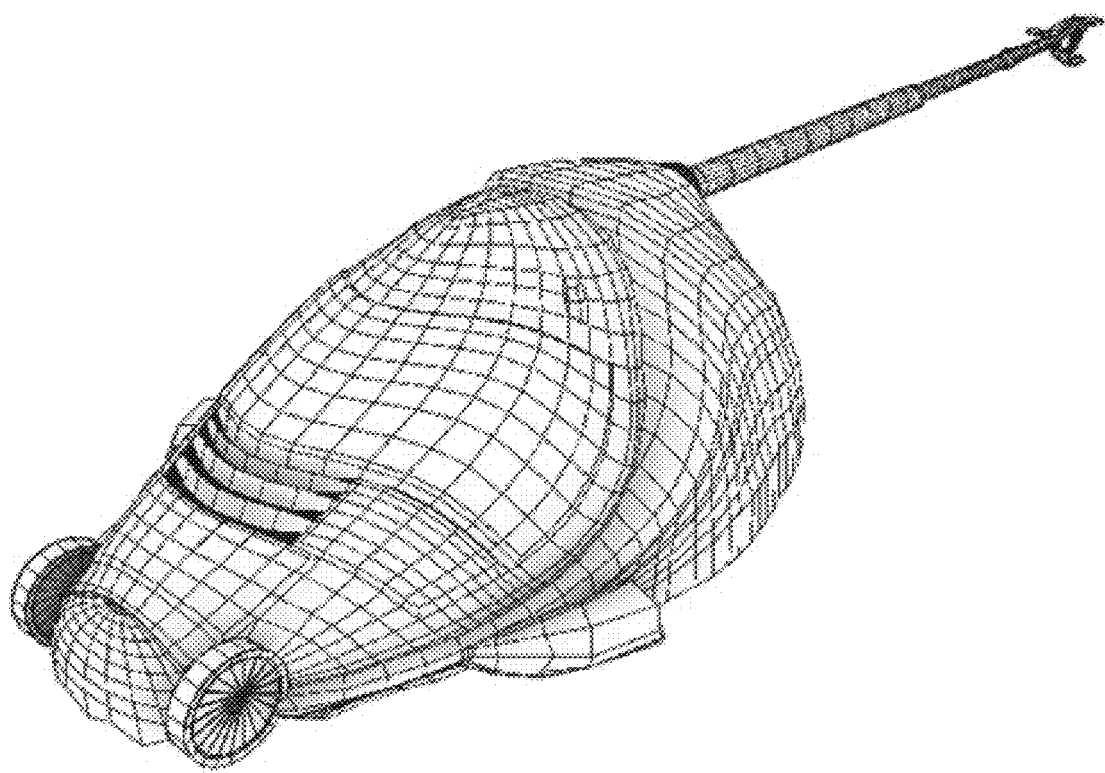
FIG. 22 is a perspective view of the lawnmower of the lawnmower of FIG. 1A.

The handle 516 preferably includes an outer sleeve 520 (shown in FIG. 21) having first and second ends 22A, 22B. As shown in FIG. 5, the first end 22A is preferably proximate to the body 510 of the lawnmower 500. The preferable connection 536 between the handle 516 and the lawnmower 500 is accomplished via the constant velocity joint 518 (one embodiment of which is shown in FIGS. 5 and 8). Referring still to FIG. 21, an inner sleeve 524 may be slidably located within the outer sleeve 520 and configured to telescope from the second and 522B of the outer sleeve 520.

A rod 528 is preferably positioned within the outer sleeve and has first and second ends 530A, 530B. The first end of the rod 528 is preferably secured in position within the outer sleeve 520. A handgrip 538 is preferably attached to a portion of the inner sleeve 524 that protrudes from the outer sleeve 520.

A motor 534 may be located in the handle 516 for controlling the rod 528 to telescope or retract the handle 516. Referring to FIG. 21, the motor is preferably, but not necessarily, a step motor and the rod may be threaded. It is preferred that the motor is located in a motor sleeve 526 that is smaller and cross-section than the inner sleeve 524. A passageway 32 may be defined between the inner sleeve 524 and the motor sleeve 526 to allow wiring or other electronics to be placed therein while being separated (and preferably an electrical isolation and physical isolation) from the motor and the rod.

Referring to FIGS. 2 and 16, it is preferable that a selectable control 540 is positioned on the handgrip portion 538 and in communication with the motor 534 to control the telescoping or retraction of the inner sleeve 524 relative to the outer sleeve 520. It is also preferable, but not necessary, that the handgrip portion 538 of the handle 516 include a second selectable control 542 for emergency shut off of the single motor and the plurality of cutting blades. As will be described below, it is preferred, but not necessary, that the second selectable control is capable of actuating electromagnetic brakes to effectively immediately halt rotation of the plurality of cutting blades.

The body 510 of the lawnmower 500 preferably has a front end 544 in the rear and 546 (as shown in FIG. 3). Referring to FIGS. 7 and 9, a roller 548 is preferably positioned on the bottom side of the body 510 to support the rear and 546 of the lawnmower 500. The roller 548 is preferably configured to roll as the lawnmower 500 is moved over a surface during operation thereof. It is preferred, but not necessary, that the roller 548 is approximately one foot in diameter and made if suitably hard material for normal operation of the lawnmower 500. However, those of ordinary skill in the art will appreciate from this disclosure, that the size of the roller 548 can be varied without departing from the scope of the present invention. The roller 548 can be a single roller having a spherical shape that is preferably the only support for the rear and of the lawnmower 500. Referring to FIGS. 7 and 1D, the rolling contact between the lawnmower 500 and the ground is preferably accomplished via a pair of wheels located in the front of the lawnmower 500 and the single roller 548 located generally in the rear end and centrally in the lawnmower 500. The use of the roller 548 allows for easy forward, lateral, and any combination thereof motion in the rear section of the lawnmower 500. This facilitates quick course correction were necessary to avoid a hazard or to avoid a possible tipping situation. It is preferred, but not necessary, that the single roller 548 is the only support for the rear and 546 of the lawnmower 500.

Referring to FIGS. 4, 5, 6, 9, and 10, the lawnmower 500 preferably uses a hydraulic axial piston 550 for rotating the plurality of cutting blades. Hydraulic axial piston are sold by Liebherr and other manufacturers. One example of a hydraulic axial piston is the A7VO manufactured by Bosch Rexroth AG. Axial hydraulic pistons use multiple hydraulic pistons to rotate drive shafts or the like. It is further preferred that the plurality of cutting blades comprise three separate sets of cutting blades (as shown in FIG. 1D). Each of the three separate sets of cutting blades preferably has its own hydraulic axial piston for driving the associated cutting blades. It is preferred that a single motor is located within the body 510 of the lawnmower 500 for driving all cutting blades (and possibly all mechanisms). It is possible to also replace the stepper motor located in the handle with the smaller hydraulic axial piston so that the entire lawnmower 500 is powered via hydraulics in combination with a battery type power source. The single motor 534 is preferably a hydraulic motor pump.

Referring to FIG. 6, a controller 560 is preferably disposed in the body 510 for operating the single motor 534. A belt 558 may engage the hydraulic axial piston 550 of each of the three separate sets cutting blades and the single motor 534. If one of the hydraulic axial pistons 550 fails, the belt 558 can provide a secondary method for driving the rotary shaft used to operate the cutting blades associated with the failed hydraulic axial piston. This allows a failure in the hydraulic line servicing the axial piston or some other failure in the hydraulic piston to occur without requiring the cessation of lawn mowing. Those of ordinary skill in the art will appreciate from this disclosure that the belt 558 may be disengaged from the axial pistons until a failure is detected or in constant passive engagement without departing from the scope of the present invention. Similarly, omission of the belt 558 is possible without departing from the scope of the present invention. Small tensioners (shown in FIG. 10) can be used to provide sufficient contact surface between the axial pistons and the belt 558 and to maintain proper tension.

Referring to FIG. 9, it is preferred that the lawnmower 500 include a fluid reservoir within the body 510. A manifold 554 is preferably disposed within the body 510 and in fluid communication with the fluid reservoir 556. The controller 560 preferably operates the manifold 554 and the single motor 534 to provide fluid to the hydraulic axial piston 550 of each of the three separate sets of cutting blades. It is preferred that the single motor is a hydraulic motor pump and that it is also the only motor within the body of the lawnmower. This allows the lawnmower 500 to be operated without using any internal combustion engines and without requiring any conduit to an external power supply (such as a power cord connected to an outlet). This allows the lawnmower 500s via zero emission lawnmower. Electromagnetic brakes can also be incorporated into each of the sets of cutting blades and/or the axial hydraulic pistons to allow for halting of the motion of the cutting blades. This additional safety feature can provide immediate stoppage of cutting blades during hazardous situations.

It is preferred that the exterior surface of the body 510 include a solar panel (s) 562 that is in electrical communication with the battery 564 located within the body 510 of the lawnmower 500 such that the lawnmower may be operated without using any internal combustion engines and without requiring any conduit to an external power supply. The lawnmower body or handgrip portion may include a display that indicates battery charge level, instant voltage draw, amperage, average voltage draw, fluid level in the fluid reservoir, and/or fluid pressure in the lawnmower 500. Alternatively, the controller 560 may transmit information regarding the above operational parameters/conditions of the lawnmower 500 for reception by a portable electronic device, such as a smart phone or the like.

It is recognized by those skilled in the art, that changes may be made to the above described embodiments without departing from the broad inventive concept thereof. For example, the lawnmower of the present invention may include only the above described roller feature, only the above described hydraulic axial piston feature, only the above described handle, or only another of the above described features, without departing from the scope of the present invention. It is understood, therefore, that this invention is not limited to the particular embodiments disclosed, but is intended to cover all modifications which are within the spirit and scope of the invention as defined by the appended claims and/or shown in the attached flowcharts.

What is claimed is:

1. A lawnmower, comprising:
    a body having a rear side and a bottom side;
    a plurality of cutting blades rotatably positioned on the bottom side and configured to be rotated by a motor; and
    a handle located on the rear side of the body, the handle being connected to the body via a constant velocity joint, the handle being configured as a single cylindrically shaped member having an adjustable length, wherein the constant velocity joint allows the single cylindrically shaped member to be moved and pivot about a connection to the body in any one of a vertical direction and a horizontal direction relative to the body of the lawnmower, the handle comprising:
        an outer sleeve having first and second ends, the first end being proximate the body of the lawnmower;
        an inner sleeve slidably located within the outer sleeve and configured to telescope from the second end of the outer sleeve; and
        a hand grip portion attached to a portion of the inner sleeve that protrudes from the outer sleeve
        a rod positioned within the outer sleeve and having first and second rod ends, the second rod end engaging the inner sleeve, the first rod end being disposed in the outer sleeve;
        a motor disposed in the handle for controlling the rod to telescope or retract the handle; and
        a selectable control on the hand grip portion of the handle in communication with the motor to control the telescoping or retraction of the inner sleeve relative to the outer sleeve.

2. The lawnmower of claim 1, wherein the constant velocity joint allows the single cylindrically shaped member to be moved and pivot about a connection to the body through three hundred sixty degrees relative to the body of the lawnmower.

3. The lawnmower of claim 1, wherein the motor is a step motor and the rod is threaded, the motor being located in a motor sleeve that is smaller in cross section than the inner sleeve, a passageway being defined between the inner sleeve and the motor sleeve to allow wiring to be placed therein while being separated from the motor and the rod.

4. The lawnmower of claim 1, wherein the body has a front end and a rear end, the lawnmower further comprising a roller positioned on the bottom side of the body to support the rear end of the lawnmower and being configured to roll as the lawnmower is moved over a surface during operation thereof, the roller being a single roller having a spherical shape and being the only support for the rear end of the lawnmower.

5. The lawnmower of claim 4, further comprising a hydraulic axial piston for rotating the plurality of cutting blades.

6. The lawnmower of claim 5, wherein the plurality of cutting blades comprise three separate sets of cutting blades each rotating about a separate vertical axis, each of the three separate sets of cutting blades having a hydraulic axial piston for driving the associated cutting blades; wherein only a single motor is located within the body of the lawnmower for driving all the plurality of cutting blades of the lawnmower, the single motor being a hydraulic motor pump.

7. The lawnmower of claim 6, further comprising:
    a controller disposed in the body for operating the single motor;
    a belt engaging the hydraulic axial piston of each of the three separate sets of cutting blades and the single motor, wherein if one of the hydraulic axial piston fails the belt provides a secondary method for operating the cutting blades associated with the failed hydraulic piston.

8. The lawnmower of claim 7, further comprising:
    a fluid reservoir disposed within the body of the lawnmower; and
    a manifold disposed within the body is in fluid communication with the fluid reservoir, wherein the controller operates the manifold and single motor to provide fluid to the hydraulic axial piston of each of the three separate sets of cutting blades.

9. The lawnmower of claim 8, wherein each of the three separate sets of cutting blades includes an electromagnetic brake for halting operation thereof.

10. The lawnmower of claim 6, wherein an exterior surface of the body comprises a solar panel, the solar panel being in electrical communication with a battery located within the body of the lawnmower such that the lawnmower is operated without using any internal combustion engines and without requiring any conduit to an external power supply.

11. The lawnmower of clam 10, wherein the body is formed of bioplastic hemp resin composite material.

12. The lawnmower of claim 10, wherein the lawnmower includes a display indicating battery charge level, current voltage draw, fluid level in the fluid reservoir, and fluid pressure within the lawnmower.

13. The lawnmower of claim 10, wherein the controller of the lawnmower transmits information regarding battery charge level, current voltage draw, fluid level within the fluid reservoir, and fluid pressure within the lawnmower for reception by a portable electronic device.

14. The lawnmower of claim 13, wherein the hand grip portion of the handle includes a second selectable control for emergency shut off of the single motor and the plurality of cutting blades.

\* \* \* \* \*